(12) United States Patent (10) Patent No.: US 12,563,304 B2

Takatsuka et al. (45) Date of Patent: Feb. 24, 2026

---

(54) MEASUREMENT DEVICE, MEASUREMENT METHOD, PROGRAM

(71) Applicant: Sony Group Corporation, Tokyo (JP)

(72) Inventors: Susumu Takatsuka, Tokyo (JP);
Hiroki Tetsukawa, Tokyo (JP);
Hidehito Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 114 days.

(21) Appl. No.: 18/681,095

(22) PCT Filed: Aug. 12, 2022

(86) PCT No.: PCT/JP2022/030816

§ 371 (c)(1),
(2) Date: Feb. 5, 2024

(87) PCT Pub. No.: WO2023/026880

PCT Pub. Date: Mar. 2, 2023

(65) Prior Publication Data

US 2024/0276104 A1 Aug. 15, 2024

(30) Foreign Application Priority Data

Aug. 26, 2021 (JP) ................................. 2021-138154

(51) Int. Cl.
*H04N 23/74* (2023.01)
*G01N 15/075* (2024.01)
(Continued)

(52) U.S. Cl.
CPC ........... *H04N 23/74* (2023.01); *G01N 15/075* (2024.01); *H04N 23/10* (2023.01); *H04N 23/51* (2023.01); *H04N 23/60* (2023.01)

(58) Field of Classification Search
CPC ........ H04N 23/74; H04N 23/10; H04N 23/51; H04N 23/60; G01N 15/075; G01N 1/10;
(Continued)

(56) References Cited

U.S. PATENT DOCUMENTS

| | | | |
|---|---|---|---|
| 10,705,008 B2 | 7/2020 | Wanders | |
| 12,284,455 B2 * | 4/2025 | Maruyama | G01N 15/1429 |

(Continued)

FOREIGN PATENT DOCUMENTS

| | | |
|---|---|---|
| EP | 3690736 A1 | 8/2020 |
| JP | 2016095259 A | 5/2016 |
| JP | 2019-165687 A | 10/2019 |
| JP | 2021-021568 A | 2/2021 |
| WO | 2012/173130 A1 | 12/2012 |
| WO | 2017/145816 A1 | 8/2017 |
| WO | 2019/135411 A1 | 7/2019 |
| WO | 2021/084833 A1 | 5/2021 |

OTHER PUBLICATIONS

International Search Report and Written Opinion mailed on Sep. 27, 2022, received for PCT Application PCT/JP2022/030816, filed on Aug. 12, 2022, 10 pages including English Translation.

*Primary Examiner* — Jared Walker

(74) *Attorney, Agent, or Firm* — XSENSUS LLP

(57) ABSTRACT

A measurement device includes: a vision sensor that is arranged facing an illumination surface of an illumination unit emitting light, and acquires pixel data asynchronously in accordance with the amount of light incident on each of a plurality of pixels arranged two-dimensionally; an imaging control unit that causes the vision sensor to capture an image; and a measurement unit that measures information related to a target object on the basis of the image captured by the imaging unit.

13 Claims, 26 Drawing Sheets

(51) Int. Cl.
 *H04N 23/10* (2023.01)
 *H04N 23/51* (2023.01)
 *H04N 23/60* (2023.01)

(58) Field of Classification Search
 CPC ....... G01N 15/1456; G01N 2015/0003; G01N
 2015/0294; G01N 2015/1027; G01N
 15/0205; G01N 15/0227; G01N
 2015/0011; G01N 2015/0053; G01N
 2015/144; G01N 2015/1486; G01N
 2015/1493; G01N 33/1893; G01N 21/27;
 G01N 21/84; G01N 33/18; G01N
 2021/177; Y02A 40/81
 See application file for complete search history.

(56) References Cited

U.S. PATENT DOCUMENTS

| | | | |
|---|---|---|---|
| 2005/0030519 A1 | 2/2005 | Roth | |
| 2017/0122807 A1* | 5/2017 | Kasahara | G01J 3/524 |
| 2018/0088027 A1* | 3/2018 | Nagai | G01N 21/05 |
| 2019/0014258 A1* | 1/2019 | Horesh | H04N 23/71 |
| 2019/0025185 A1* | 1/2019 | Katoh | G01N 15/1434 |
| 2020/0124516 A1* | 4/2020 | Vidal | G06T 7/20 |
| 2020/0355499 A1* | 11/2020 | Hinderling | G01C 1/04 |
| 2022/0377222 A1* | 11/2022 | Diken | H04N 23/73 |

* cited by examiner

| MEASUREMENT SETTINGS | MEASUREMENT START CONDITION | CONDITION FOR STARTING MEASUREMENT RECEIVE TIME TO START MEASUREMENT OR A MEASUREMENT START COMMAND |
| --- | --- | --- |
| | OPERATION SETTING | OPERATION SETTING OF ILLUMINATION UNIT |
| | IDENTIFICATION PROGRAM | RULE-BASED OR MACHINE LEARNING |
| | DISTANCE/SPEED MEASUREMENT PROGRAM | RULE-BASED OR MACHINE LEARNING |
| | MEASUREMENT END CONDITION | CONDITION FOR ENDING MEASUREMENT RECEIVE TIME TO END MEASUREMENT OR MEASUREMENT END COMMAND |

1

MEASUREMENT DEVICE, MEASUREMENT METHOD, PROGRAM

CROSS-REFERENCE TO RELATED APPLICATIONS

The present application is based on PCT filing PCT/JP2022/030816, filed Aug. 12, 2022, which claims priority from Japanese Patent Application No 2021-138154, filed Aug. 26, 2021, the contents of each are hereby incorporated by reference.

TECHNICAL FIELD

The present technology relates to a measurement device, a measurement method, and a program, and particularly to technology for measuring a target object in water.

BACKGROUND ART

There has been proposed a measurement device that excites phytoplankton by irradiating it with excitation light of a predetermined wavelength and then causes a light-receiving element to receive fluorescence from the excited phytoplankton, thereby measuring the amount of phytoplankton (e.g., see PTL 1).

CITATION LIST

Patent Literature

[PTL 1]
    JP 2019-165687A

SUMMARY

Technical Problem

In the measurement device described above, the light-emitting element is arranged so as to have a predetermined angle with respect to the optical axis of the excitation light emitted from an illumination unit, so that the light-receiving element does not directly receive the excitation light emitted from the illumination unit. Therefore, in the measurement device described above, in order to emit the excitation light from the illumination unit onto a light-receiving range where the light-receiving element can receive the light, there needs to be some distance provided between the illumination unit and the light-receiving range to increase the output of the excitation light. This led to a risk of higher power consumption in the measurement device described above.

The present technology aims to reduce the power consumption.

Solution to Problem

A measurement device according to the present technology includes: a vision sensor that is arranged facing an illumination surface of an illumination unit emitting light, and acquires pixel data asynchronously in accordance with the amount of light incident on each of a plurality of pixels arranged two-dimensionally; an imaging control unit that causes the vision sensor to capture an image; and a measurement unit that measures information related to a target object on the basis of an image captured by the imaging unit.

Thus, in the measurement device, the distance between the illumination unit and the vision sensor can be made short.

BRIEF DESCRIPTION OF DRAWINGS

FIG. 2 is a diagram for explaining target objects and movements of the target objects.

FIG. 6 is a diagram for explaining an example of measurement settings.

DESCRIPTION OF EMBODIMENTS

Hereinafter, embodiments will be described in the following order.

<1. First Embodiment>
[1.1 Usage example of measurement device]
[1.2 Target object]
[1.3 Configuration of measurement device]
[1.4 Measurement processing]
[1.5 Measurement processing]
[1.6 Distance/speed measurement processing]
<2. Second Embodiment>
[2.1 Configuration of measurement device]
<3. Third Embodiment>
[3.1 Configuration of measurement device]
[3.2 Cell movement processing]
<4. Another Configuration Example of Measurement Device>
<5. Summary of Embodiments>
<6. Present Technology>

1. First Embodiment

1.1 Usage Example of Measurement Device

First, a configuration of a measurement device 1 according to a first embodiment of the present technology will be described.

The measurement device 1 is a device for measuring information on a target object which is microorganisms or particulates present in water such as sea water, the information being, for example, the number, types, densities, speeds, directions of movement, shape variations and the like of target objects.

Organisms as a target object are phytoplankton present in water, zooplankton, and aquatic microorganisms such as larvae of aquatic organisms. Further, particulates as a target object are microplastics, dusts, sands, marine snow, air bubbles, and the like. However, these are examples; the target objects may be anything else.

Figure 1:
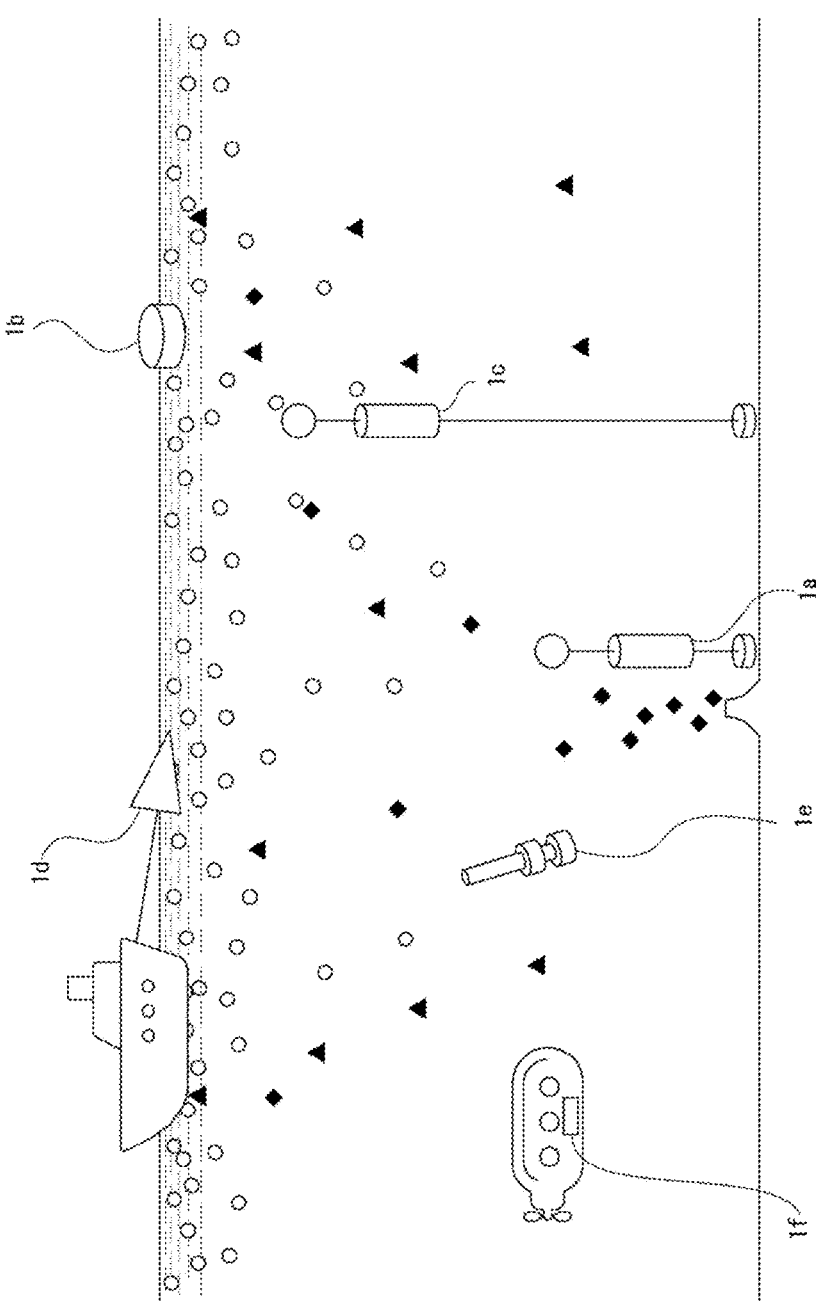
FIG. 1 is a diagram for explaining a usage example of a measurement device 1.

FIG. 1 is a diagram for explaining a usage example of the measurement device 1. The measurement device 1 is used for various purposes such as marine organism investigations, measurement of water quality in aquaculture, selection and investigation of fishing grounds, measurement of microplastics, marine development impact investigations, vessel ballast water investigations, marine resources exploration, measurement of blue carbon, global warming investigations, and carbon content estimation investigations, and examples of the measurement device 1 include measurement devices 1a to 1f shown in FIG. 1.

The measurement device 1a is placed in deep sea and used for investigations of deep-see organisms, investigations of marine sediments or undersea currents, and the like. The measurement device 1b is placed in a marine surface layer and is used for the measurement of water quality in aquaculture, red tide detection, and the like. The measurement device 1c is placed in a middle ocean layer and used for the measurement of marine snow, microplastics, and the like.

The measurement device 1d is towed by ship or the like and used. The measurement device 1e is mounted in a marine drone. The measurement device 1f is mounted in a submarine.

1.2 Target Object

Figure 2:
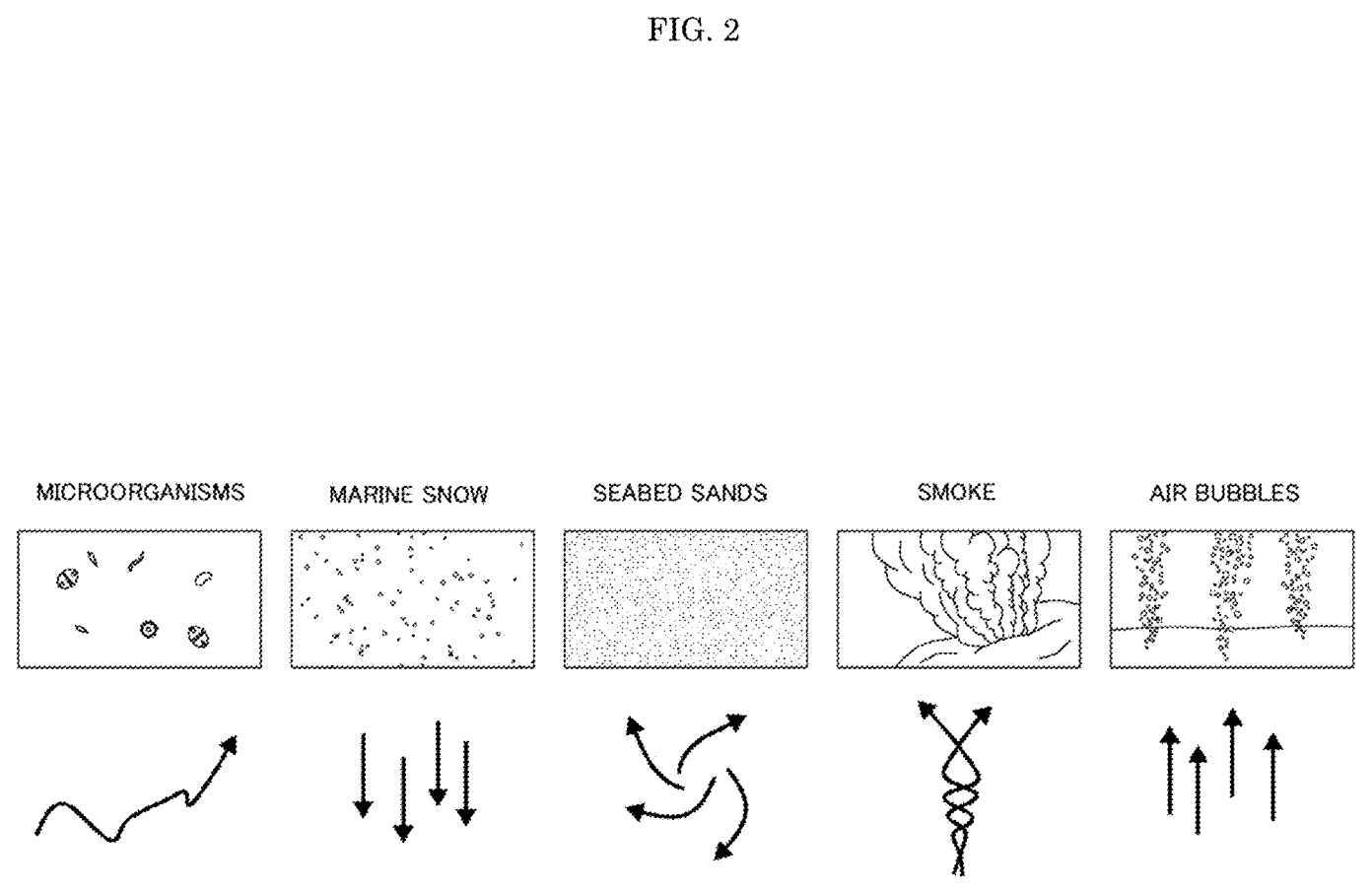

FIG. 2 is a diagram for explaining a target object and a movement of the target object. Note that, in FIG. 2, the upper part shows images of target objects and the lower part shows the directions of movement of the target objects by arrows.

As shown in FIG. 2, the target objects include microorganisms, marine snow, seabed sands, smoke, and air bubbles.

Some microorganisms are known to show runnability when irradiated with light of a specific wavelength. Runnability here refers to innate behaviors of an organism towards light (external stimuli). Therefore, when a microorganism having runnability is irradiated with light of a specific wavelength, the microorganism moves according to the runnability.

Marine snow is, for example, particles of emissions and carcasses of plankton present in sea water or degraded substances thereof, and moves in such a manner as to sink in the sea (in the direction of gravity).

Seabed sands are, for example, particles such as sands settled on the seabed and move in such a manner as to swirl by the seabed flow.

Smoke is, for example, a phenomenon where geothermally heated high-temperature water discharges from a hydrothermal vent on the seabed. Since the hot water discharging from a hydrothermal vent often reaches temperatures of several hundred degrees and contains high amounts of heavy metals and hydrogen sulfide as dissolved components, by reaction with the sea water, black smoke or white smoke moves upward while swirling.

Air bubbles are, for example, natural gases such as methane and carbon dioxide leaking out (discharging) from the seabed, or carbon dioxide leaking out of a reservoir that is pressurized artificially by CCS (carbon capture and storage), and move upward from the seabed.

Thus, regardless of whether the target objects are microorganisms or particulates, some target objects move in a specific direction of movement, and the measurement device 1 specifies, as a target object, a microorganism and particulates with a known direction of movement.

1.3 Configuration of Measurement Device

Figure 3:
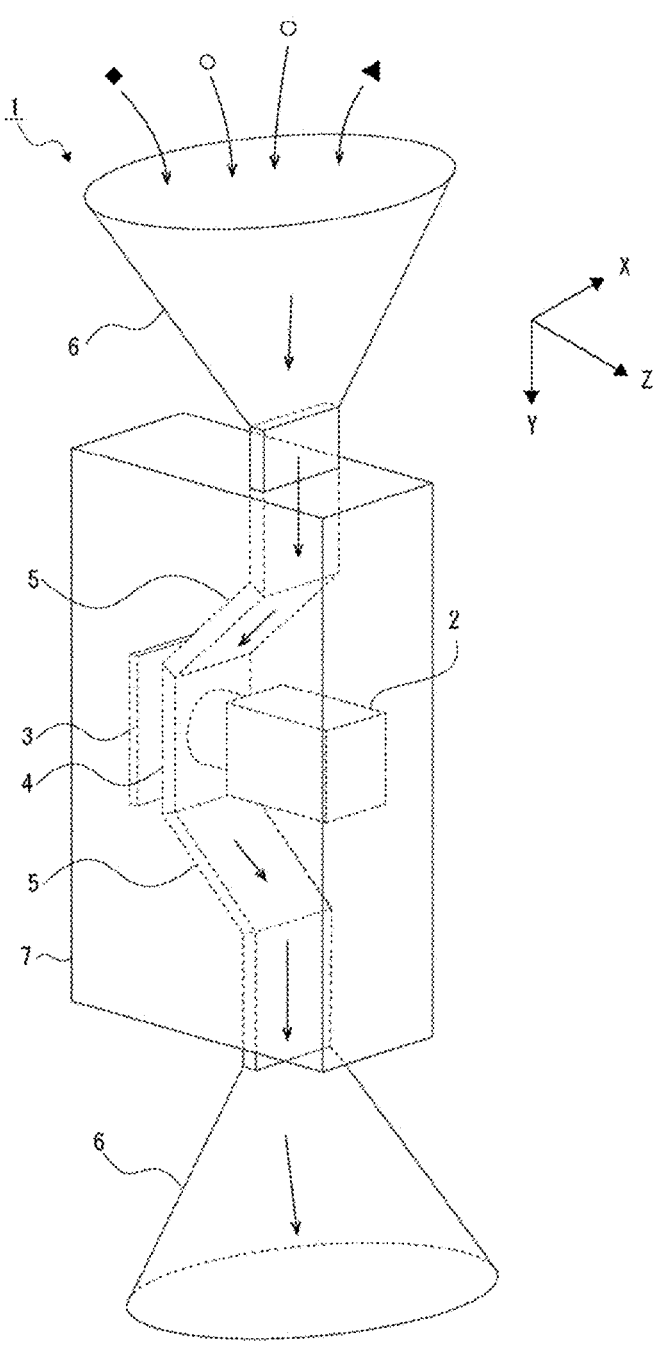
FIG. 3 is a diagram for explaining a configuration of the measurement device 1 according to a first embodiment.
Figure 4:
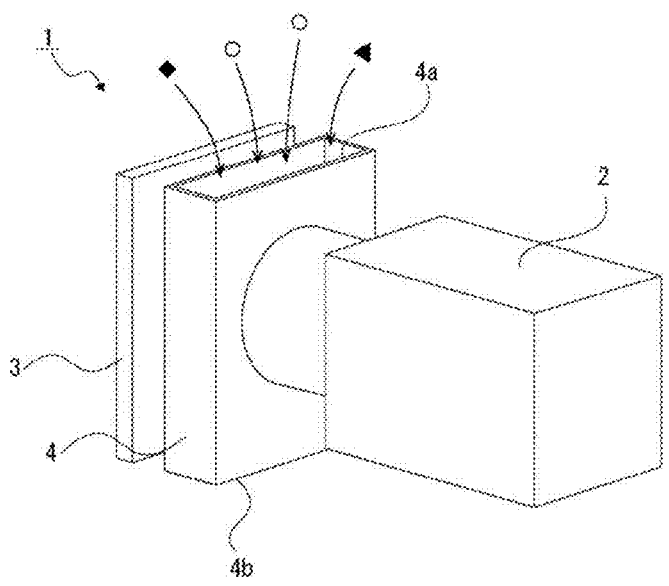
FIG. 4 is a diagram in which a part of the measurement device 1 is extracted.

FIG. 3 is a diagram for explaining a configuration of the measurement device 1 according to the first embodiment. FIG. 4 is a diagram in which a part of the measurement device 1 is extracted.

As shown in FIG. 3 and FIG. 4, the measurement device 1 includes a main body 2, an illumination unit 3, a cell 4, a conduction unit 5, a collection unit 6, and a light-shielding unit 7.

The main body 2 includes an imaging unit 14 to be described later, the imaging unit 14 being disposed so as to face an illumination surface of the illumination unit 3 via the cell 4.

The illumination unit 3 has a plurality of light-emitting elements (LED) arranged two-dimensionally, and emits light toward the main body 2 and cell 4 side. The illumination unit 3 is capable of switching light of different wavelengths and radiating such light, the light having wavelengths varying by 10 nm, for example.

The cell 4 is disposed between the imaging unit 14 and the illumination unit 3 and is shaped into a cylinder so that a flow path is formed therein. Specifically, as shown in FIG. 4, the cell 4 is provided with openings 4a, 4b at the top and bottom, respectively, to allow particles (particulates, microorganisms) to flow in and out, and the flow path is formed so as to stretch from the upper opening 4a to the lower opening 4b. The cell 4 is formed of a transparent member and transmits light. Accordingly, light radiated from the illumination unit 3 is guided to the imaging unit 14 via the cell 4. The imaging unit 14 captures an image of the inside of the cell 4 as an imaging range on the basis of the light radiated from the illumination unit 3.

The cell 4 has the upper opening 4*a* and the lower opening 4*b* connected to the conduction unit 5. As with the cell 4, the conduction unit 5 has openings at the top and bottom and is shaped into a cylinder so as to form therein a flow path stretching from the top to the bottom. The flow path of the cell 4 and the flow path of the conduction unit 5 are communicated with each other.

The conduction unit 5 has one end side connected to have a predetermined angle with respect to the cell 4, and has the other end side extending along a direction in which the cell 4 extends.

The other end side of the conduction unit 5 is connected to the collection unit 6. The collection unit 6 is shaped into a rough circular truncated cone where the diameter thereof gradually becomes small from the circular bottom surface toward the upper surface. The upper surface and bottom surface of the collection unit 6 are opened, and a flow path stretching from the upper surface toward the bottom surface is formed in the collection unit 6. The upper surface of the collection unit 6 is connected to the conduction unit 5, and the flow path of the conduction unit 5 and the flow path of the collection unit 6 are communicated with each other.

The collection unit 6 provided on the upper side is disposed in such a manner that the bottom surface thereof faces upward, and the collection unit 6 provided on the lower side is disposed in such a manner that the bottom surface thereof faces downward. Therefore, in the measurement device 1, as shown by the arrows in FIG. 3, particles (particulates, microorganisms) are collected efficiently from the collection unit 6, and thereafter the particles pass through the conduction unit 5, the cell 4, the conduction unit 5, and the collection unit 6 in this order by gravity or on their own.

However, particles that move laterally do not flow into the cell 4. Therefore, the measurement device 100 can measure the target objects without being affected by water currents.

The light-shielding unit 7 is provided with a space therein and blocks light from entering inside from the outside. The light-shielding unit 7 houses all of the main body 2, the illumination unit 3, and the cell 4, and houses the one end side of the conduction unit 5.

Thus, the imaging range captured by the imaging unit 14, that is, the cell 4, is protected from light from the outside, thereby reducing the impact of the external light on imaging by the imaging unit 14.

Figure 5:
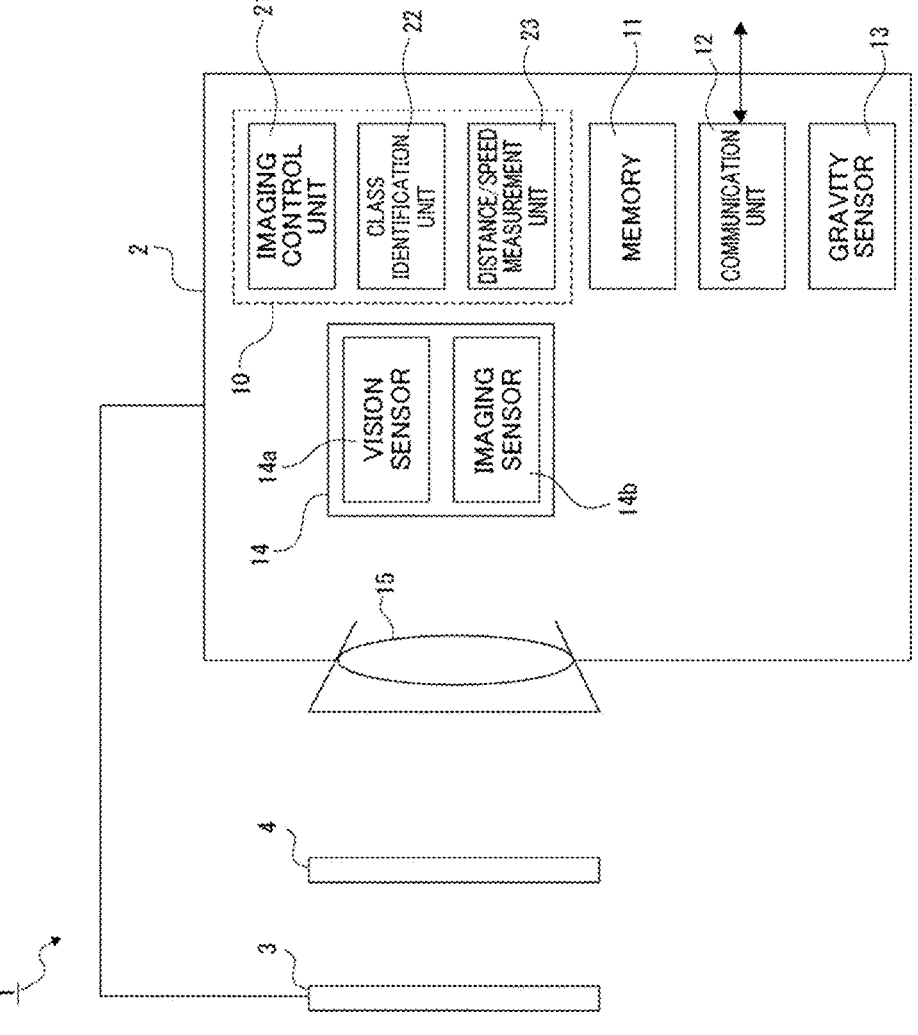
FIG. 5 is a diagram for explaining an internal configuration of the measurement device 1.

FIG. 5 is a diagram for explaining an internal configuration of the measurement device 1. As shown in FIG. 5, the main body 2 includes a control unit 10, a memory 11, a communication unit 12, a gravity sensor 13, the imaging unit 14, and a lens 15.

The control unit 10 is configured to include a microcomputer having, for example, a CPU (Central Processing Unit), a ROM (Read Only Memory), and a RAM (Random Access Memory), and controls the entire measurement device 1. The control unit 10 functions as an imaging control unit 21, a class identification unit 22, and a distance/speed measurement unit 23. The imaging control unit 21, the class identification unit 22, and the distance/speed measurement unit 23 will be described later in detail.

The control unit 10 also executes processing of reading data stored in the memory 11, processing of causing the memory 11 to store data, and transmission/reception of various types of data to/from external equipment via the communication unit 12.

The memory 11 is configured by a nonvolatile memory. The communication unit 12 performs wire or wireless data communication with the external equipment. The gravity sensor 13 detects a gravitational acceleration (direction of gravity) and outputs the detection result to the control unit 10. Note that the measurement device 1 does not have to include the gravity sensor 13.

The imaging unit 14 includes a vision sensor 14*a* and an imaging sensor 14*b*. The vision sensor 14*a* is a sensor called DVS (Dynamic Vision Sensor) or EVS (Event-Based Vision Sensor). The vision sensor 14*a* captures an image inside of the cell 4 through the lens 15. In the following description, the horizontal direction of the cell 4 is described as an X-axis direction, the vertical direction of the cell 4 is described as a Y-axis direction, and an imaging direction of the imaging unit 14 (optical axis direction) is described as a Z-axis direction, as shown in FIG. 2. The imaging unit 14 does not have to include the imaging sensor 14*b*.

The vision sensor 14*a* is an asynchronous image sensor in which a plurality of pixels having photoelectric conversion elements are arranged two-dimensionally and a detection circuit for detecting an address event in real time is provided for each pixel. Note that the address event refers to an event that occurs in accordance with the amount of incident light with respect to addresses allocated respectively to the plurality of pixels arranged two-dimensionally, and examples of the address event include a case where a current value of a current based on an electric charge generated in a photoelectric conversion element or the amount of change in the current value exceeds a certain threshold.

The vision sensor 14*a* detects the presence/absence of the occurrence of an address event for each pixel, and upon detection of the occurrence of an address event, reads a pixel signal from the pixel where the address event has occurred, as pixel data. In other words, the vision sensor 14*a* acquires pixel data asynchronously in response to the amount of light incident on each of the plurality of two-dimensionally arranged pixels.

Since the vision sensor 14*a* executes the operation of reading a pixel signal for a pixel where the occurrence of an address event is detected, the vision sensor 14*a* can read extremely faster than a synchronous image sensor that executes an operation of reading image signals for all pixels at a predetermined frame rate, and the amount of data to be read per frame is small.

Therefore, in the measurement device 1, a movement of a target object can be detected more quickly by using the vision sensor 14*a*. In addition, the vision sensor 14*a* is capable of not only reducing the amount of data but also lowering power consumption.

Moreover, since the dynamic range of the vision sensor 14*a* is wider than that of the imaging sensor 14*b*, the light emitted from the illumination unit 3 is less likely to cause so-called overexposure even when emitted directly onto a pixel (photoelectric conversion element).

Also, since the vision sensor 14*a* acquires pixel data only when an address event occurs, even when the light emitted from the illumination unit 3 is emitted directly onto a photoelectric conversion element, the vision sensor 14*a* cannot acquire pixel data, unless the amount of light changes. Therefore, unless the amount or wavelength of light emitted from the illumination unit 3 changes, the illumination unit 3 does not appear on an image captured by the vision sensor 14*a*.

The imaging sensor 14*b* is a CCD (Charge Coupled Device)-type or CMOS (Complementary Metal-Oxide-Semiconductor)-type image sensor, wherein a plurality of pixels having photoelectric conversion elements are arranged two-dimensionally. The imaging sensor 14b captures an image of a predetermined imaging range through the lens 15 at regular intervals according to a predetermined frame rate. Note that in the measurement device 1, a zone plate, a pinhole plate, or a transparent plate can be used in place of the lens 15.

The vision sensor 14a and the imaging sensor 14b are arranged so as to capture an image of substantially the same imaging range through the lens 15. For example, a half mirror, not shown, may be arranged between the vision sensor 14a and imaging sensor 14b and the lens 15, so that one of the light beams dispersed by the half mirror is made incident on the vision sensor 14a and the other is made incident on the imaging sensor 14b.

1.4 Measurement Method

A method for measuring a target object (measurement processing) will be described next.

Target objects are known to reflect or emit light of different wavelengths or intensities with respect to each wavelength of light emitted. Thus, in the measurement device 1, a target object is irradiated with light of different wavelengths, and an image obtained with the reflected light (or excitation light) is captured, thereby measuring information related to the target object such as the type and size of the target object, the distance of the imaging direction, and the speed of the target object.

FIG. 6 is a diagram for explaining an example of measurement settings. The control unit 10 performs a measurement according to previously designated measurement settings shown in FIG. 6. As the measurement settings, a measurement start condition, an operation setting of the illumination unit 3, an identification program (identification method), a distance/speed measurement program (distance/speed measurement method), and a measurement end condition are designated.

A condition for starting the measurement is designated as the measurement start condition, and, for example, receiving the time to start the measurement or a measurement start command that is input through the communication unit 12 is designated.

A setting for operating the illumination unit 3 is designated as the operation setting. As will be described hereinafter in detail, in the operation setting, a partial light emission operation for causing only some of the plurality of light-emitting elements of the illumination unit 3 to emit light and a whole light emission operation for causing all of the light-emitting elements to emit light are set in a switchable manner.

Further, the operation setting is set in such a manner that the wavelengths vary by 10 nm within the range from 400 nm to 700 nm, such as 400 nm, 410 nm, . . . 690 nm, and 700 nm, and that light is emitted so as to provide OFF between the wavelengths.

Note that the illumination unit 3 is turned OFF, that is, the time for no light emission is provided, in order to image the light when the target object emits it (excitation). In addition, providing OFF between the wavelengths brings about the effect of allowing the asynchronous vision sensor 14a to easily detect wavelength-based events.

A program (method) for identifying the type of the target object is designated as the identification program, and, for example, an identification program by machine learning, a rule-based identification program, and the like are designated.

A program (method) for measuring the distance, speed, and the like of the target object is designated as the distance/speed measurement program, and, for example, a distance/speed measurement program by machine learning, a rule-based distance/speed measurement program, and the like are designated.

A condition for ending the measurement is designated as the measurement end condition, and, for example, receiving the time to end the measurement or a measurement end command that is input through the communication unit 12 is designated.

1.5 Measurement Processing

Figure 7:
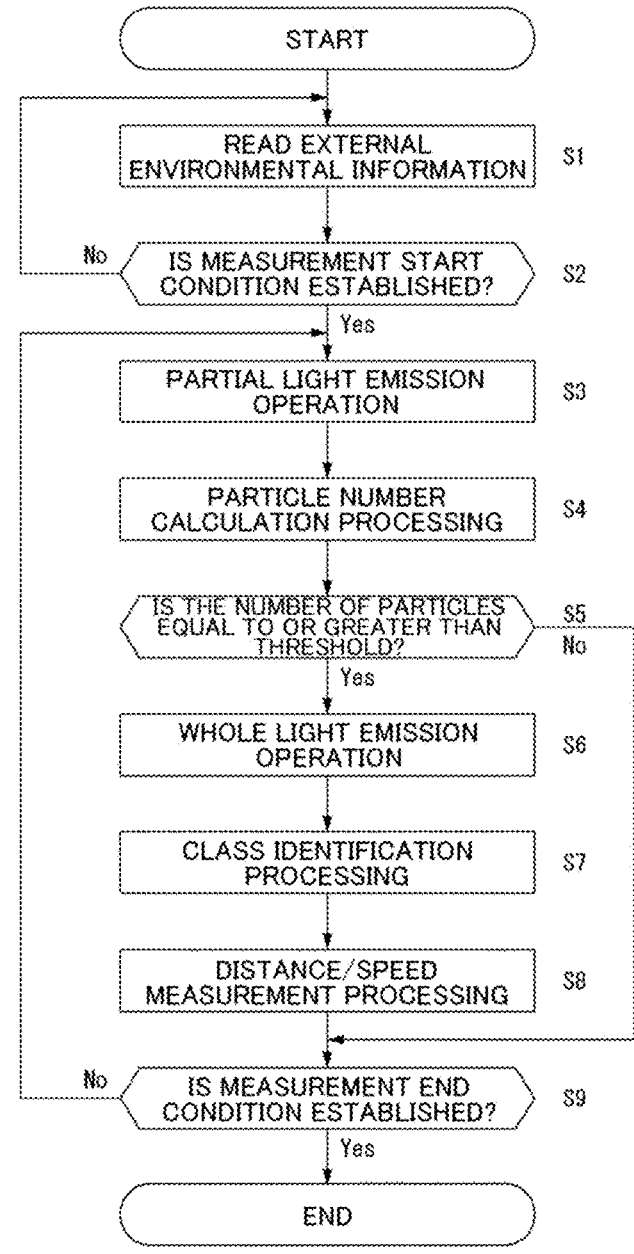
FIG. 7 is a flowchart showing a procedure of measurement processing.
Figure 8:
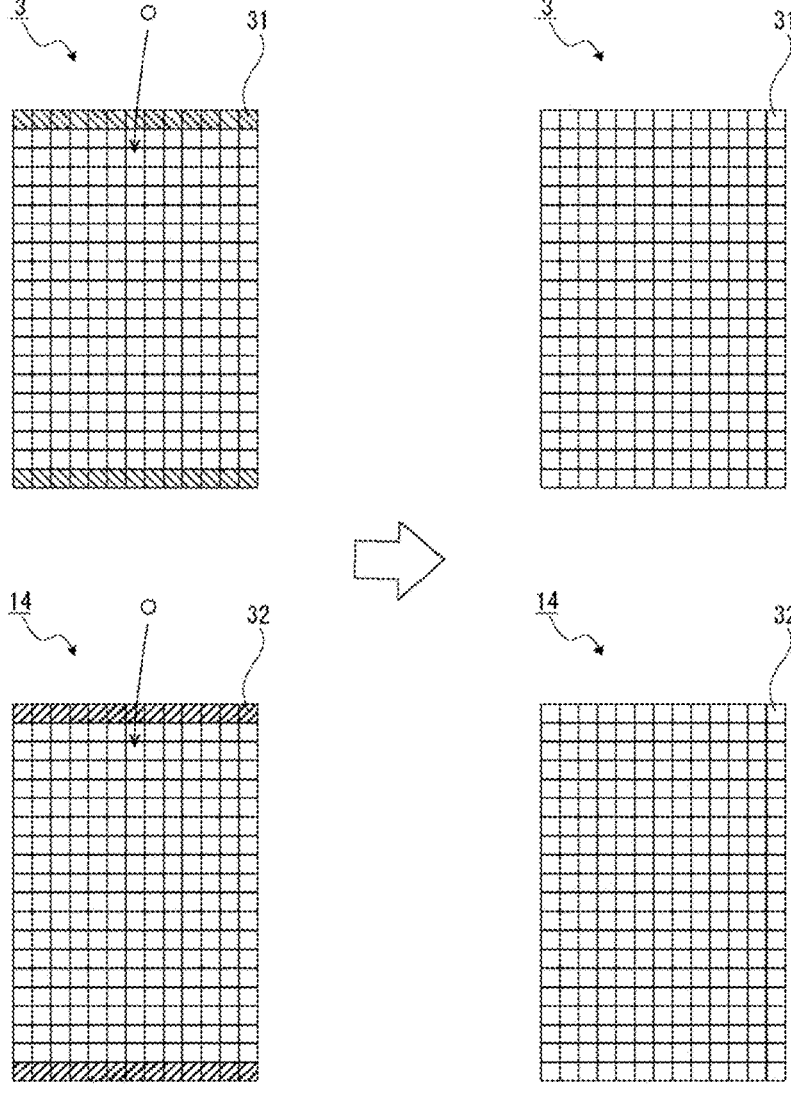
FIG. 8 is a diagram for explaining a light emission operation.
Figure 9:
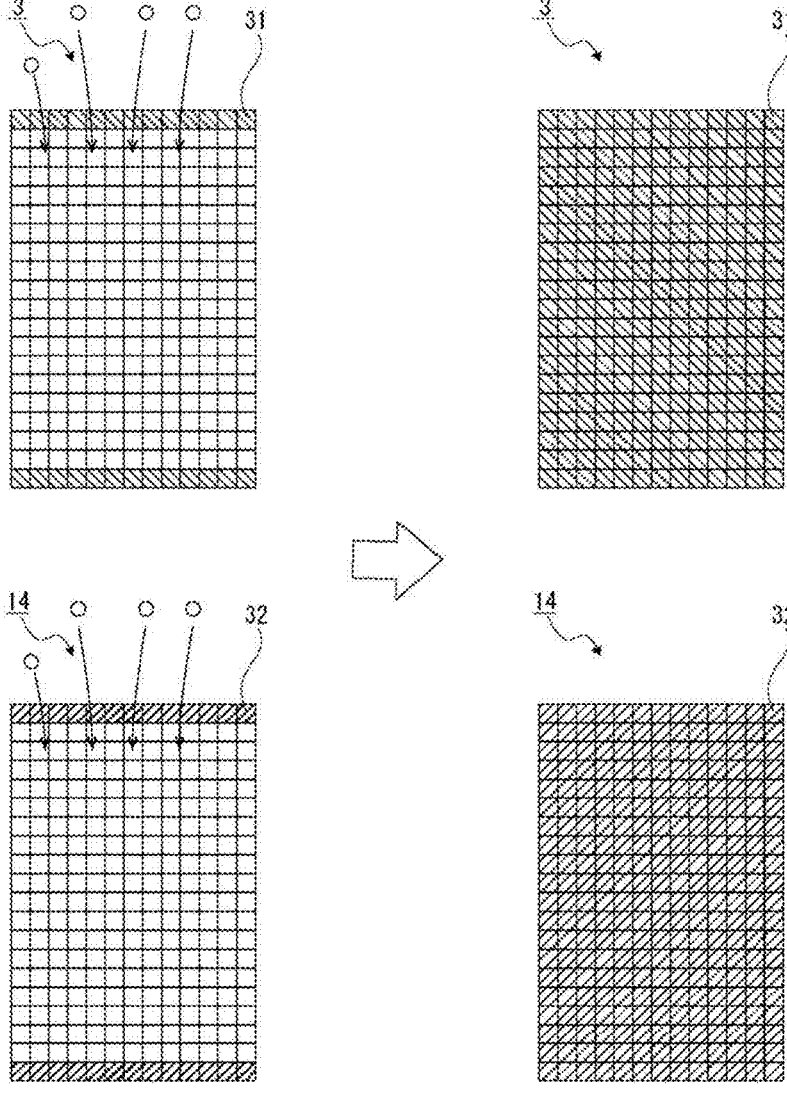
FIG. 9 is a diagram for explaining a light emission operation.

FIG. 7 is a flowchart showing a procedure of measurement processing. FIG. 8 and FIG. 9 are diagrams for explaining a light emission operation. The control unit 10 executes the measurement processing shown in FIG. 7 by executing software (including the identification program and the distance/speed measurement program) stored in the memory 11.

In step S1, the control unit 10 reads external environmental information to be described later. Then, in step S2, the control unit 10 determines whether the measurement start condition designated in the measurement settings has been established or not. The control unit 10 repeats step S1 and step S2 until the measurement start condition is established.

If the measurement start condition has been established (Yes in step S2), in step S3, the imaging control unit 21 performs the partial light emission operation for causing some of the light-emitting elements of the illumination unit 3 to emit light, in accordance with the operation setting designated in the measurement settings. In doing so, as shown in FIG. 8, the imaging control unit 21 causes, for example, light-emitting elements 31 arranged at the uppermost stage of the illumination unit 3 and light-emitting elements 31 arranged at the lowermost stage of the illumination unit 3 to emit light, but does not cause the other light-emitting elements 31 to emit light. Hereinafter, the hatched light-emitting elements 31 indicate that light is emitted therefrom, and the blank light-emitting elements 31 indicate that light is not emitted therefrom.

That is, the imaging control unit 21 causes only the light-emitting elements 31 corresponding to (close to) the openings 4a, 4b of the cell 4 where particles (microorganisms or particulates) enter, to emit light. In doing so, for example, in an attempt to capture an image of the whole for one minute, the imaging control unit 21 performs the partial light emission operation over the first portion (e.g., 10 seconds).

The imaging control unit 21 also drives only photoelectric conversion elements 32 of the imaging unit 14 (vision sensor 14a) arranged facing the light-emitting elements 31 emitting light, to perform the imaging operation. Hereinafter, the hatched photoelectric conversion elements 32 indicate that the photoelectric conversion elements 32 are driving, and the blank photoelectric conversion elements 32 indicate that the photoelectric conversion elements 32 are not being driven.

In step S4, the imaging control unit 21 creates one image (frame data) on the basis of pixel data input during a predetermined period, detects, as one particle, a pixel group within a predetermined range of the image where a movement is detected, and adds up the detected particles, thereby calculating the number of detected particles.

In step S5, the imaging control unit 21 determines whether the calculated number of particles is equal to or greater than a predetermined particle number threshold. Here, the particle number threshold is set to a value indicating that there are a certain number of particles flowing in or out of the cell 4, the value subsequently enabling an efficient measurement.

If the number of particles is not equal to or greater than the particle number threshold (No in step S5), the imaging control unit 21 inhibits all of the light-emitting elements 31 of the illumination unit 3 from emitting light (radiating light), as shown in FIG. 8. The imaging control unit 21 also stops driving the imaging unit 14 for the remaining time (e.g., 50 seconds), and shifts the processing to step S9.

On the other hand, if the number of particles is equal to or greater than the particle number threshold (Yes in step S5), the imaging control unit 21 performs the whole light emission operation of causing all of the light-emitting elements 31 of the illumination unit 3 to emit light (radiate light), as shown in FIG. 9. The imaging control unit 21 also drives all of the photoelectric conversion elements 32 of the imaging unit 14 for the remaining time, to cause them to perform the imaging operation, and shifts the processing to step S7.

In step S7, the class identification unit 22 performs class identification processing. In the class identification processing, the class identification unit 22 identifies (specifies) the type of the target object on the basis of the image (pixel data and image data) captured by the imaging unit 14. Specifically, the class identification unit 22 derives identification information from the image captured by the imaging unit 14, and compares definition information stored in the memory 11, to detect the target object.

The definition information is provided for each target object and stored in the memory 11. The definition information includes the type, movement information, and image information of the target object.

The movement information is information detected on the basis of an image captured mainly by the vision sensor 14*a*, and information based on the fact that the target object shown in the lower part of FIG. 2 has moved. The movement information is information such as, when the target object is a microorganism, the direction of movement of the microorganism (positive or negative) with respect to the light source and the trajectory of the microorganism. The movement information is information such as, when the target object is particulates, the direction of movement and the trajectory of the particulates.

The image information is information detected on the basis of an image captured mainly by the imaging sensor 14*b*, and external information of the target object. Note that the image information may be information detected on the basis of an image captured by the vision sensor 14*a*.

The definition information may also include the direction of gravity detected by the gravity sensor 13 and external environmental information acquired through the communication unit 12. Depth, position coordinates (latitude, longitude, and plane rectangular coordinates of the measurement spot), electric conductivity, temperatures, ph, concentrations of gases (e.g., methane, hydrogen, helium), concentrations of metals (e.g., manganese, iron), and the like can be considered as the external environmental information.

The class identification unit 22 detects particles present in the imaging range on the basis of the image (pixel data) captured by the vision sensor 14*a*. For example, the class identification unit 22 creates one image (frame data) on the basis of the pixel data input within a predetermined period, and detects, as one particle, a pixel group within a predetermined range within the image where a movement is detected.

The class identification unit 22 also traces particles between a plurality of frames by means of pattern matching or the like. The class identification unit 22 then derives the direction of movement and the trajectory of the particles on the basis of the tracking result of the particles.

Note that the period at which the class identification unit 22 generates an image from the pixel data may be the same period (frame rate) at which the imaging sensor 14*b* acquires the image data or a shorter period.

Further, for the particles for which the identification information is derived, the class identification unit 22 extracts an image portion corresponding to the particles from the image data input from the imaging sensor 14*b*. The class identification unit 22 then derives external features by image analysis as the identification information, on the basis of the extracted image portion. Since a known method can be used as the image analysis, the description thereof is omitted herein.

The class identification unit 22 collates the wavelength of the light emitted by the illumination unit 3 and the identification information derived for the detected particles (the direction of movement, trajectory, external features) with the definition information according to a designated identification program, to identify a target object. Here, if, for example, the identification information of the derived particles is within the range indicated by the definition information of the target object, the class identification unit 22 identifies that the derived particles are of the type indicated by the definition information.

These pieces of definition information are stored in the memory 11 by a method varying from one identification program to the next. For example, as to the rule-based identification program, the definition information is set in advance by a user and stored in the memory 11. Also, as to the identification program by machine learning, the definition information is generated by machine learning in a learning mode, updated, and stored in the memory 11.

Thereafter, the class identification unit 22 stores the identification result of the detected target object and the image portion of the target object captured by the imaging sensor 14*b*, in the memory 11, and transmits them to an external device via the communication unit 12.

In step S8, the distance/speed measurement unit 23 executes distance/speed measurement processing for measuring the distance of the imaging direction for imaging the target object and the speed of the target object (information on the position of the target object), on the basis of the type of the target object identified by the class identification unit 22. The distance/speed measurement processing of step S5 will be described hereinafter in detail.

Thereafter, in step S9, the control unit 10 determines whether the measurement end condition is established or not. The control unit 10 then repeats steps S3 to S9 until the measurement end condition is established, and when the end condition is established (Yes in step S9), ends the determination processing.

1.6 Distance/Speed Measurement Processing

The distance/speed measurement processing will be described next. As described above, in step S8, the distance/speed measurement unit 23 executes the distance/speed measurement processing on the basis of the rule-based distance/speed measurement program or the distance/speed measurement program by machine learning.

The rule-based distance/speed measurement processing and the distance/speed measurement processing by machine learning are now described with specific examples.

1.6.1 Rule-Based Distance/Speed Measurement Processing

Figure 10:
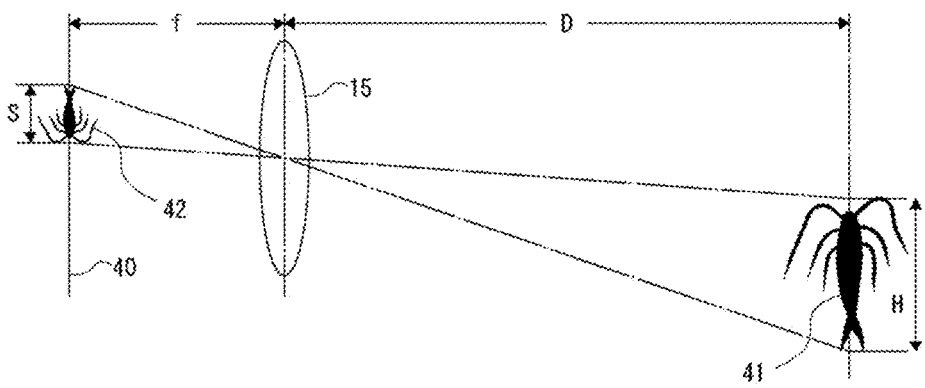
FIG. 10 is a diagram for explaining rule-based distance/speed measurement processing.

FIG. 10 is a diagram for explaining the rule-based distance/speed measurement processing. In the rule-based distance/speed measurement processing, a focal distance f of the vision sensor 14a is stored in the memory 11 as known information.

Statistical information (average size H) for each target object is also stored in the memory 11. The statistical information is registered by the user in advance as a database.

When a target object is specified from the image based on the pixel data, the distance/speed measurement unit 23 reads the average size H of the target object, and the focal distance f of the vision sensor 14a from the memory 11. Thereafter, the distance/speed measurement unit 23 calculates a longitudinal length s of an image 42 captured the target object on an imaging surface 40 on the basis of, for example, the number of pixels in which the image 42 is captured.

The distance/speed measurement unit 23 also calculates a distance D of the imaging direction (Z direction) from the measurement device 1 to a target object 41 by using an equation (1).

$$D = fH/s \qquad (1)$$

In this manner, the distance/speed measurement unit 23 calculates (measures) the distance D from the measurement device 1 to the actual target object 41 every time the image based on the pixel data is acquired (every time a target object is detected from the image).

For the target object 41 being tracked between continuous images, the distance/speed measurement unit 23 also calculates (measures) the speed in the imaging direction (Z-axis direction) on the basis of the interval at which the images are acquired and the distance D between the images.

As described above, in the rule-based distance/speed measurement processing, the distance/speed measurement unit 23 measures information on the positions of target objects on the basis of the statistical information (average size) for each target object.

1.6.2 Distance/Speed Measurement Processing by Machine Learning

Figure 11:
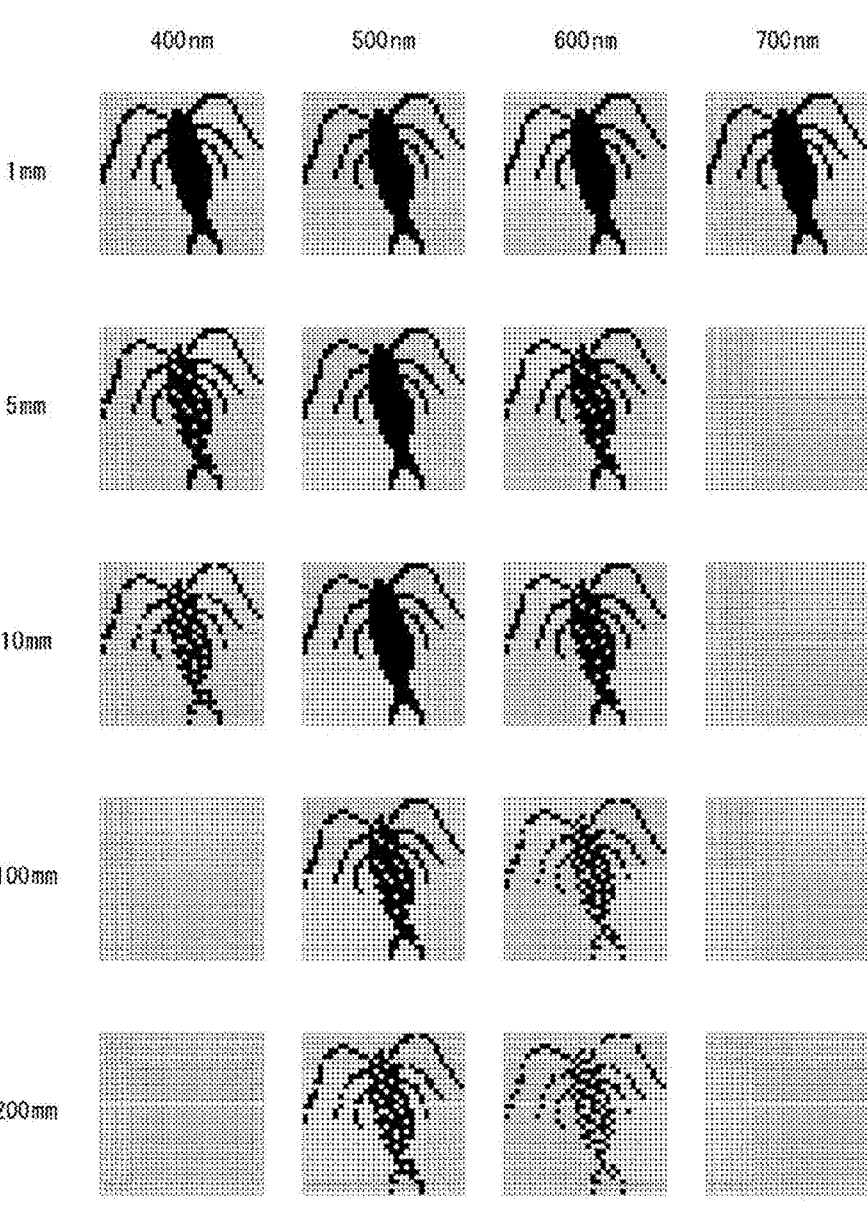
FIG. 11 is a diagram for explaining an image to be training data.
Figure 12:
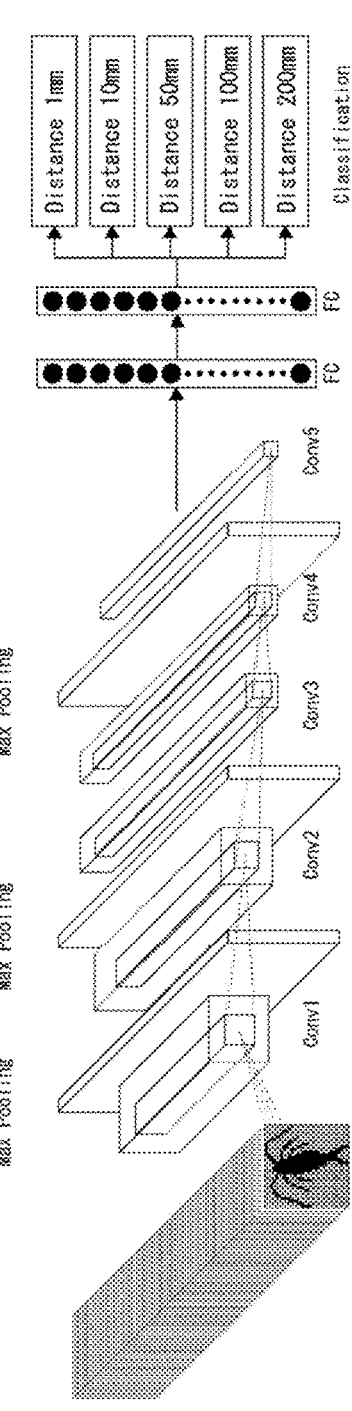
FIG. 12 is a model diagram of deep learning.

FIG. 11 is a diagram for explaining an image to be training data. FIG. 12 is a model diagram of deep learning.

In the distance/speed measurement processing by machine learning, machine learning is performed using an image, which is training data, shown in FIG. 11, for example, to generate a model (architecture) for the distance/speed measurement processing.

Specifically, images obtained by the vision sensor 14a imaging known target objects are prepared in advance with five patterns of the distance in the imaging direction from the measurement device 1 to the target object, i.e., 1 mm, 5 mm, 10 mm, 100 mm, and 200 mm, and 31 patterns of the wavelengths of the emitted light varying by 10 nm from 400 nm to 700 nm, that is, a total of 153 patterns.

Then, for each of the prepared images, the distance/speed measurement unit 23 detects, as a target object, a pixel group within a predetermined range where a movement is detected, and resizes the pixel group to 32 pixels×32 pixels, thereby generating the image which is the training data shown in FIG. 11.

Note that FIG. 11 shows a part of the image which is the training data. In the ocean, the attenuation rate of light having a wavelength of approximately 500 nm is low, and the attenuation rates of light having a wavelength smaller than approximately 500 nm and light having a wavelength greater than approximately 500 nm become higher away from the wavelength of approximately 500 nm.

Further, the greater the distance from the measurement device 1 and the target object, the lower the arrival rate of the light.

Thus, as shown in FIG. 11, in the image obtained by imaging the target object, the closer the target object is to the measurement device 1, or the closer the wavelength of the emitted light is to 500 nm, the more vivid the image of the target object. The more distant the target object is from the measurement device 1, or the farther the wavelength of the emitted light is from 500 nm, the less vivid the image of the target object, or the target object is not imaged at all.

After resizing the images which are the training data, the distance/speed measurement unit 23 causes a deep neural network to perform machine learning on the training data composed of these images, as shown in FIG. 12. This model is composed of, for example, five convolutional layers (Conv 1 to Conv 5), three pooling layers (Max Pooling), and two fully-coupled layers (FC). By machine learning, a model that eventually outputs a one-dimensional classified vector having five elements from Distance 1 mm to Distance 200 mm is generated and stored in the memory 11.

Such machine learning by a deep neural network is performed for each target object, and the model is generated for each target object and stored in the memory 11.

Also, when the type of the target object is specified by the class identification unit 22, the distance/speed measurement unit 23 reads the model of the specified type from the memory 11. The distance/speed measurement unit 23 also resizes the target object portion of the image captured by the vision sensor 14a to 32 pixels×32 pixels, and inputs the resized image to the model that has been read. As a result, the value of the one-dimensional classified vector having five elements from Distance 1 mm to Distance 200 mm is output. The distance/speed measurement unit 23 then outputs (measures) the element of the highest value among the five elements (any of Distance 1 mm to Distance 200 mm), as the distance of the target object in the imaging direction.

For the target object being tracked between continuous images, the distance/speed measurement unit 23 also calculates (measures) the speed in the imaging direction (Z-axis direction) on the basis of the interval at which the images are acquired and the distance D between the images in the imaging direction.

As described above, in the distance/speed measurement processing by machine learning, the distance/speed measurement unit 23 measures the information on the positions of the target objects on the basis of the learning results of the information on the positions learned beforehand for the respective types of the target objects.

2. Second Embodiment

Figure 13:
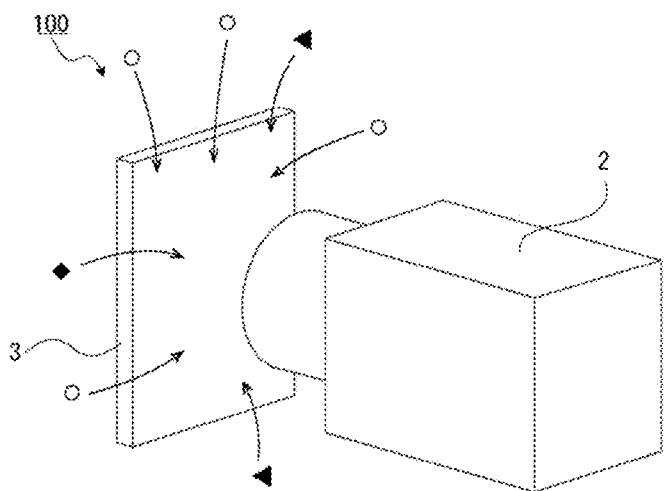
FIG. 13 is a diagram for explaining a configuration of a measurement device 100 according to a second embodiment of the present technology.

FIG. 13 is a diagram for explaining a configuration of a measurement device 100 according to a second embodiment of the present technology. As shown in FIG. 13, the measurement device 100 is different from the measurement device 1 of the first embodiment in not being provided with the cell 4, the conduction unit 5, the collection unit 6, and the light-shielding unit 7, but the other configurations are the same as those of the measurement device 1.

That is, the measurement device 100 according to the second embodiment only has the main body 2 and the illumination unit 3. Since the measurement device 100 is not provided with the cell 4 that restricts the circulation direction, particles can flow in and out between the main body 2 and the illumination unit 3 from all directions. Therefore, the measurement device 100 can measure target objects affected by water currents.

The measurement device 100 according to the second embodiment performs measurement processing similarly to the measurement device 1 according to the first embodiment. However, the partial light emission operation of step S3 is different from that of the measurement device 1 according to the first embodiment. The partial light emission operation of step S3 is now described.

Figure 14:
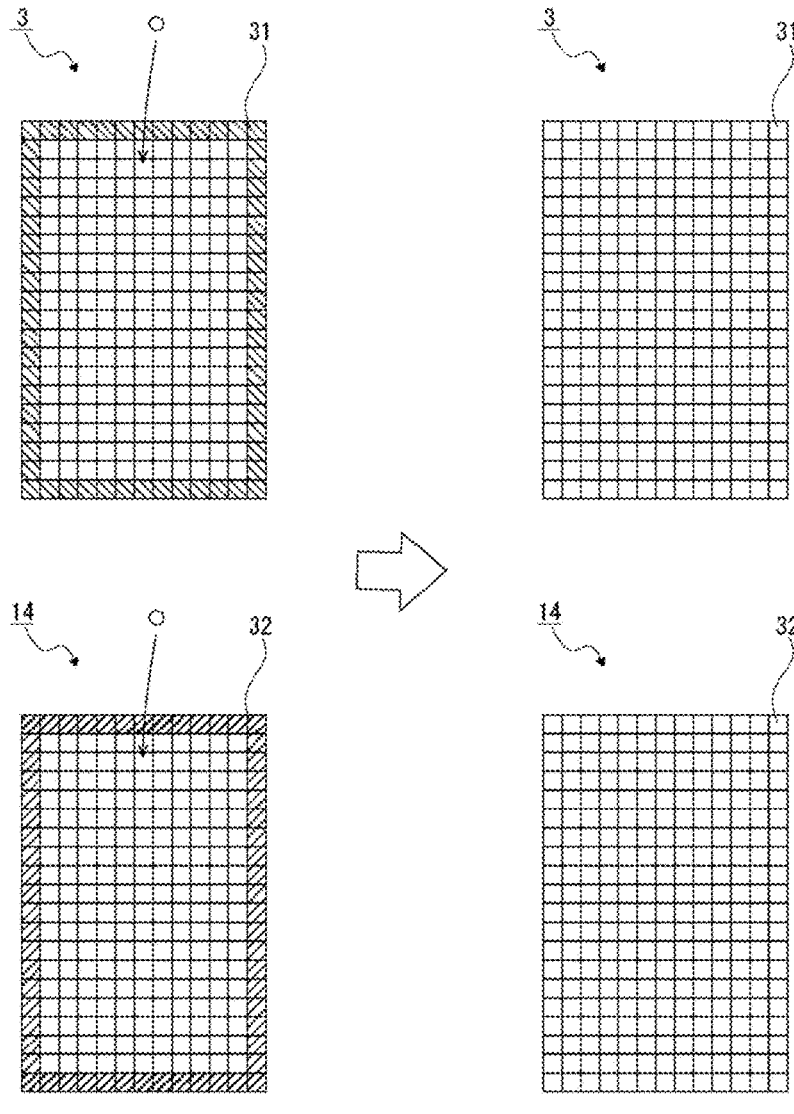
FIG. 14 is a diagram for explaining a light emission operation.
Figure 15:
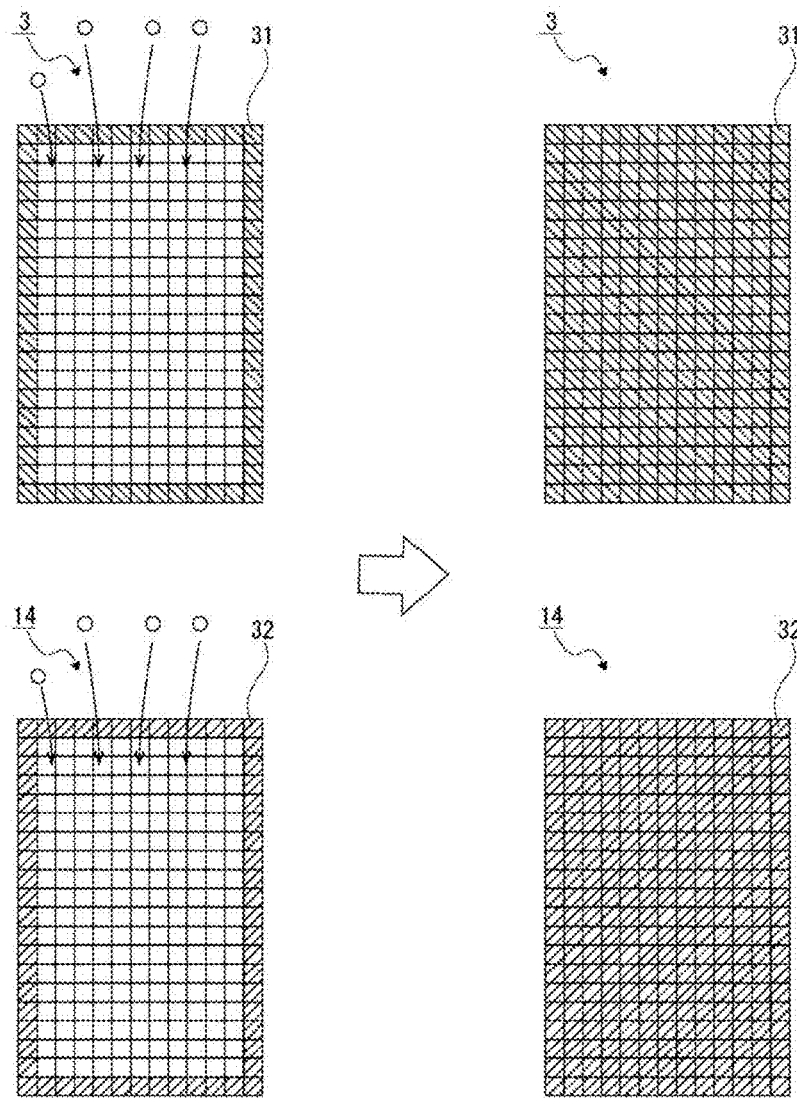
FIG. 15 is a diagram for explaining a light emission operation.

FIG. 14 and FIG. 15 are diagrams for explaining a light emission operation. In step S3, as shown in FIG. 14 and FIG. 15, the imaging control unit 21 performs the partial light emission operation where the light-emitting elements 31 arranged on the outer rim in the illumination unit 3 are caused to emit light but the other light-emitting elements 31 are not caused to emit light.

In other words, the imaging control unit 21 causes only the light-emitting elements 31 corresponding to a particle entrance in the imaging range of the imaging unit 14. In doing so, for example, in an attempt to capture an image of the whole for one minute, the imaging control unit 21 performs the partial light emission operation over the first portion (e.g., 10 seconds).

The imaging control unit 21 also drives only photoelectric conversion elements 32 of the imaging unit 14 arranged facing the light-emitting elements 31 emitting light, to perform the imaging operation.

Then, as in the first embodiment, in step S4, the imaging control unit 21 creates one image (frame data) on the basis of pixel data input during a predetermined period, detects, as one particle, a pixel group within a predetermined range of the image where a movement is detected, and adds up the detected particles, thereby calculating the number of detected particles.

Thereafter, in step S5, if the number of particles is not equal to or greater than the particle number threshold (No in step S5), the imaging control unit 21 inhibits all of the light-emitting elements 31 of the illumination unit 3 from emitting light, as shown in FIG. 14. The imaging control unit 21 also stops the imaging by the imaging unit 14 for the remaining time, and shifts the processing to step S9.

On the other hand, if the number of particles is equal to or greater than the particle number threshold (Yes in step S5), the imaging control unit 21 performs the whole light emission operation of causing all of the light-emitting elements 31 of the illumination unit 3 to emit light, as shown in FIG. 15. The imaging control unit 21 also drives all of the photoelectric conversion elements 32 of the imaging unit 14 for the remaining time, to cause them to perform imaging, and shifts the processing to step S7.

3. Third Embodiment

3.1 Configuration of Measurement Device

Figure 16:
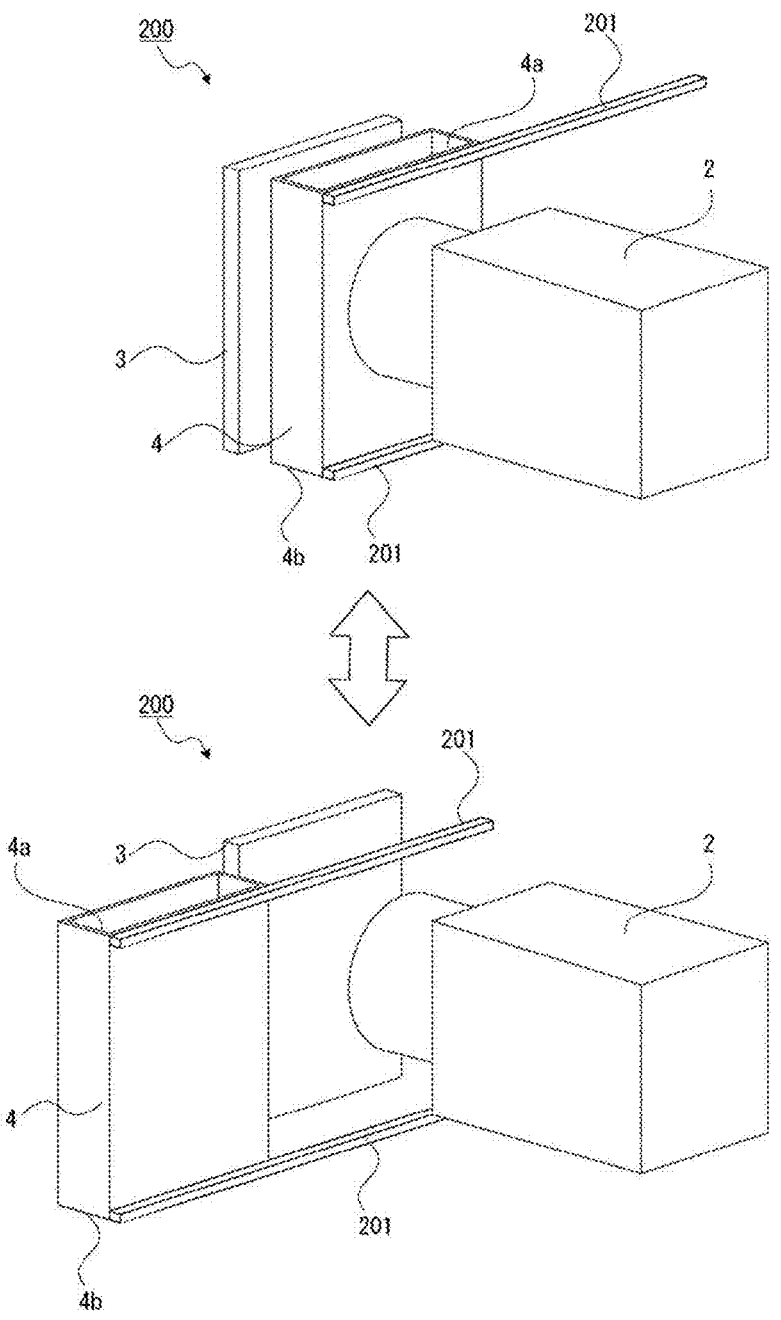
FIG. 16 is a diagram for explaining a configuration of a measurement device 200 according to a third embodiment of the present technology.

FIG. 16 is a diagram for explaining a configuration of a measurement device 200 according to a third embodiment of the present technology. For explanatory convenience, FIG. 16 and the following description omit the description of the conduction unit 5 and the collection unit 6, but the conduction unit 5 and the collection unit 6 may or may not be provided. Also, the measurement device 200 is not provided with the light-shielding unit 7.

As shown in FIG. 16, the measurement device 200 is different from the measurement device 1 of the first embodiment in being provided with a movement mechanism 201 for moving the cell 4.

The movement mechanism 201 moves the cell 4 on the basis of the control of the control unit 10. The movement mechanism 201 can move the cell 4 to a cell-present imaging position where the cell 4 is located between the illumination unit 3 and the imaging unit 14 (the main body 2) and a no-cell imaging position where the cell 4 is located in a position away from between the illumination unit 3 and the imaging unit 14 (the main body 2).

Therefore, the measurement device 200 is capable of performing the measurement processing according to the first embodiment and the second embodiment. That is, the measurement device 200 is capable of performing both the measurement not affected by water currents and the measurement affected by water currents.

3.2 Cell Movement Processing

Figure 17:
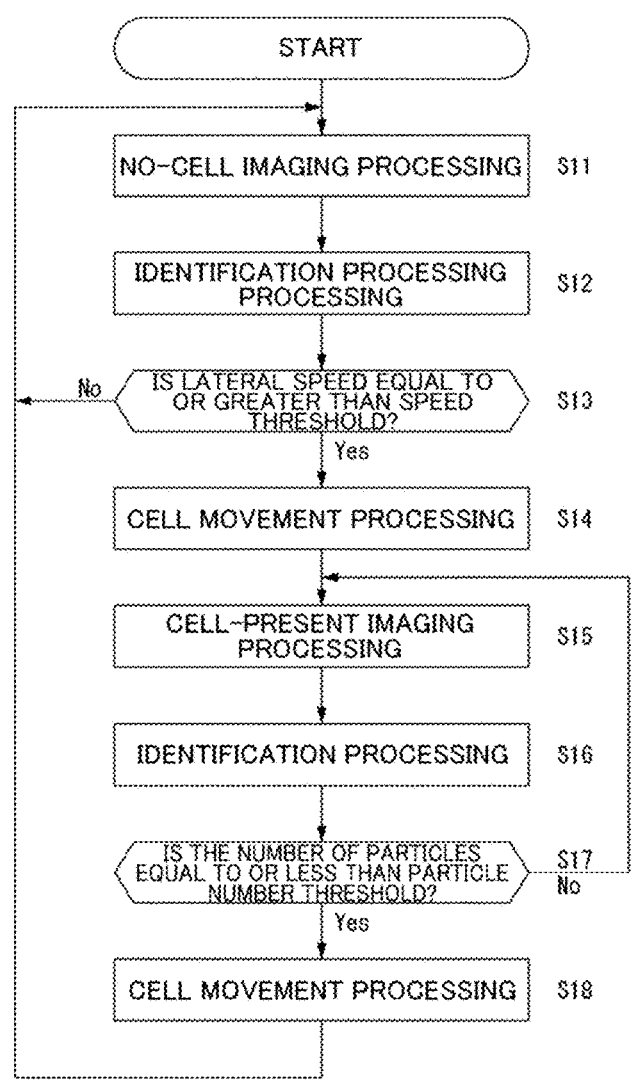
FIG. 17 is a flowchart showing a procedure of cell movement processing.

FIG. 17 is a flowchart showing a procedure of cell movement processing. The control unit 10 executes the cell movement processing for moving the cell 4. As an initial condition, the cell 4 is assumed to have moved to the no-cell imaging position.

As shown in FIG. 17, in step S11, the imaging control unit 21 causes the illumination unit 3 to emit light and causes the imaging unit 14 to perform imaging, in a state in which the cell 4 is moved to the no-cell imaging position. Then, in step S12, the class identification unit 22 executes the same class identification processing as step S7 described above, and the distance/speed measurement unit 23 executes the same distance/speed measurement processing as step S8 described above.

In step S13, the imaging control unit 21 then determines whether or not the speed of movement of a detected target object in a lateral direction (horizontal direction) (lateral movement speed, hereinafter) is equal to or greater than a predetermined speed threshold. As a result, when the lateral movement speed is equal to or greater than the speed threshold (Yes in step S13), it is determined that the impact of water currents is strong, and the imaging control unit 21 moves the cell 4 to a cell-present position in step S14.

In step S15, the imaging control unit 21 causes the illumination unit 3 to emit light and causes the imaging unit 14 to perform imaging, in a state in which the cell 4 is moved to the cell-present imaging position. Then, in step S16, the class identification unit 22 calculates the number of imaged particles.

In step S17, the imaging control unit 21 determines whether or not the calculated number of particles is equal to or less than a predetermined particle number threshold. As a result, when the number of particles is equal to or less than the particle number threshold (Yes in step S17), it is determined that the number of particles to be measured is too low to carry out efficient measurement, and the imaging control unit 21 moves the cell 4 to a no-cell position in step S18, and shifts the processing to step S11.

On the other hand, when the lateral movement speed is not equal to or greater than the speed threshold (No in step S13), it is determined that the impact of water currents is small, and the control unit 10 performs, for example, the measurement processing described above, and returns the processing to step S11.

Furthermore, when the number of particles is not equal to or less than the particle number threshold (No in step S17), it is determined that the number of particles to be measured is high enough to carry out efficient measurement, and the control unit 10 performs, for example, the measurement processing described above, and returns the processing to step S11.

In this manner, in the measurement device, 200, both the measurement not affected by water currents and the measurement affected by water currents can be performed by moving the cell 4 to the cell-present position or the no-cell position.

4. Other Configuration Example of Measurement Device

The embodiments are not limited to the specific examples described above, and configurations as various modifications can be adopted.

In the foregoing embodiments, the measurement devices 1, 100, 200 measure the number, types, densities, speeds, directions of movement, shape variations and the like of target objects as information on the target objects. However, examples of the information on the target objects may include the sizes and carbon contents of the target objects.

In the foregoing embodiments, the illumination unit 3 is provided in such a manner that the plurality of light-emitting elements are arranged two-dimensionally. However, the illumination unit 3 may be anything that emits light or may be a combination of a lighting and an optical mechanism such as a light-guiding plate or a reflector.

Figure 18:
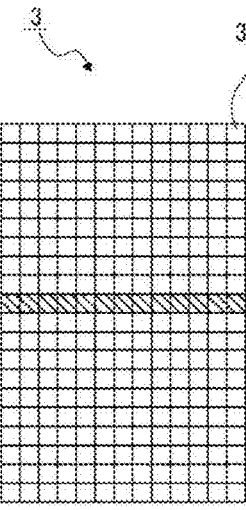
FIG. 18 is a diagram for explaining a partial light emission operation according to a modification.
Figure 19:
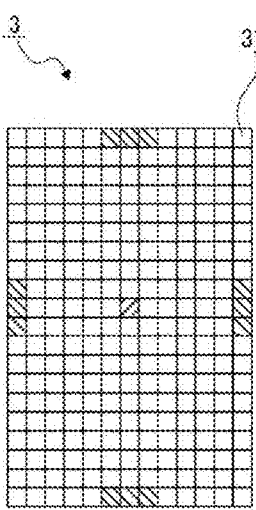
FIG. 19 is a diagram for explaining a partial light emission operation according to a modification.

According to the foregoing embodiments, in the partial light emission operation, light is emitted from the light-emitting elements 31 corresponding to the openings 4a, 4b of the cell 4 and the light-emitting elements 31 on the outer rim. However, light may be emitted from other light-emitting elements 31 by causing some of the light-emitting elements 31 of the illumination unit 3 to emit light. FIG. 18 and FIG. 19 are diagrams for explaining a partial light emission operation according to a modification. As shown in FIG. 18, the imaging control unit 21 may cause light-emitting elements 31 of one predetermined row in the illumination unit 3 to emit light. In this case, whether to continue the measurement or not can be determined on the basis of the number of particles passing through the predetermined row.

Also, as shown in FIG. 19, the imaging control unit 21 may cause the top, bottom, left and right predetermined light-emitting elements 31 to emit light of a predetermined wavelength and may cause the middle light-emitting element 31 to emit light of a different wavelength. In this case, light of a plurality of different wavelengths can be emitted from the light-emitting elements 31, allowing the runnability of microorganisms, for example, to appear efficiently.

According to the foregoing embodiments, in the partial light emission operation, the photoelectric conversion elements 32 of the vision sensor 14a that arranged facing some of the light-emitting elements 31 of the illumination unit 3 are driven in conjunction by causing the light-emitting elements 31 to emit light. However, all of the photoelectric conversion elements 32 of the vision sensor 14a may be driven when some of the light-emitting elements 31 of the illumination unit 3 are caused to emit light. Since the vision sensor 14a acquires the pixel data from the pixels (photoelectric conversion elements 32) where an address event occurs, pixels (photoelectric conversion elements 32) where an address even does not occur are not operated. For this reason, there is a high likelihood of an address event not occurring in pixels that are arranged facing the light-emitting elements 31 that do not emit light. Thus, power consumption is hardly increased even when all of the photoelectric conversion elements 32 of the vision sensor 14a are driven.

Figure 20:
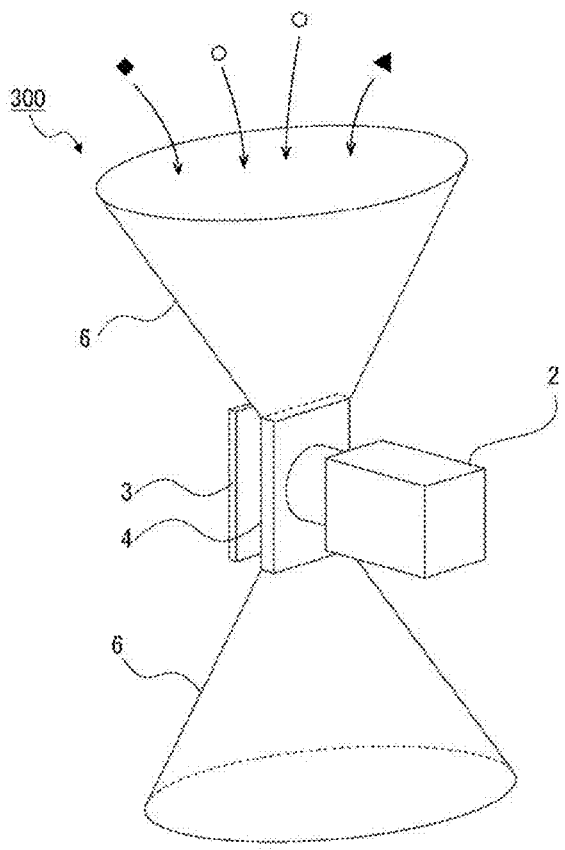
FIG. 20 is a diagram for explaining a modification of the measurement device according to the first embodiment.
Figure 21:
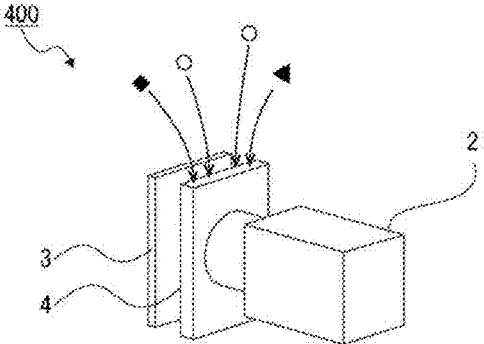
FIG. 21 is a diagram for explaining a modification of the measurement device according to the first embodiment.
Figure 22:
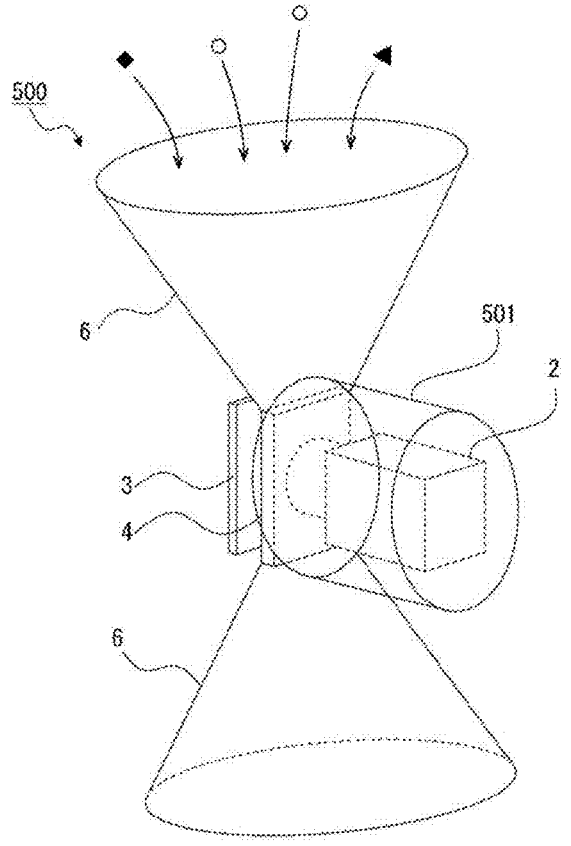
FIG. 22 is a diagram for explaining a modification of the measurement device according to the first embodiment.

FIG. 20 to FIG. 22 are diagrams for explaining a modification of the measurement device according to the first embodiment. The measurement device 1 according to the first embodiment includes the main body 2, the illumination unit 3, the cell 4, the conduction unit 5, the collection unit 6, and the light-shielding unit 7. However, when measuring in an aphotic zone or at a depth where the effects of sunlight are minor, the measurement device may not include the conduction unit 5 and the light-shielding unit 7. For example, as shown in FIG. 20, a measurement device 300 may include the main body 2, the illumination unit 3, the cell 4, and the collection unit 6, wherein the collection unit 6 may be connected to the opening 4a and the opening 4b of the cell 4.

In addition, as shown in FIG. 21, a measurement device 400 may not include the conduction unit 5, the collection unit 6, and the light-shielding unit 7. That is, the measurement device 400 may include the main body 2, the illumination unit 3, and the cell 4, and the opening 4a and the opening 4b of the cell 4 may be opened.

Moreover, as shown in FIG. 22, a measurement device 500 may not include the conduction unit 5 and the light-shielding unit 7 but have the main body 2 housed in a pressure-resistant container 501 for protecting the main body 2 from high water pressure in deep sea. Note that the pressure-resistant container 501 may be in any shape.

Figure 23:
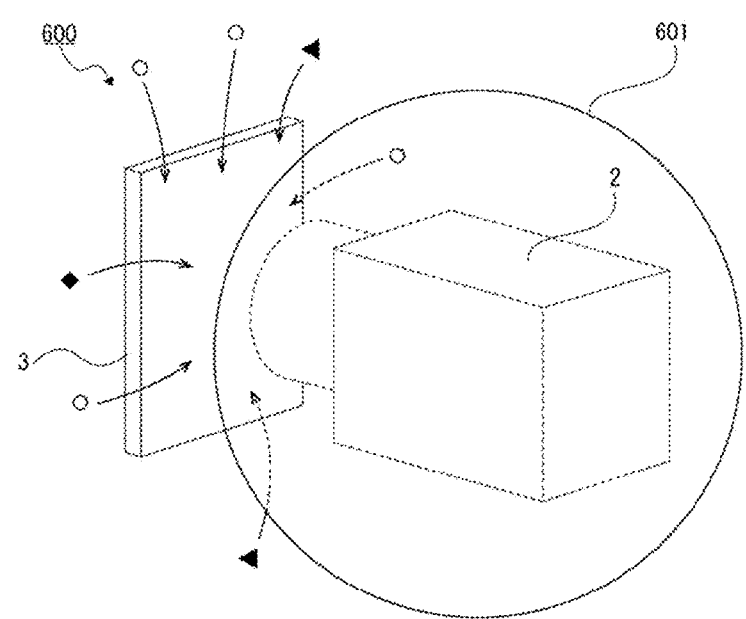
FIG. 23 is a diagram for explaining a modification of the measurement device according to the second embodiment.

FIG. 23 is a diagram for explaining a modification of the measurement device according to the second embodiment. A measurement device 600 according to the second embodiment may have the main body 2 housed in a pressure-resistant container 601 for protecting the main body 2 from high water pressure in deep sea. Note that the pressure-resistant container 601 may be in any shape.

5.1 Modification 1

Figure 24:
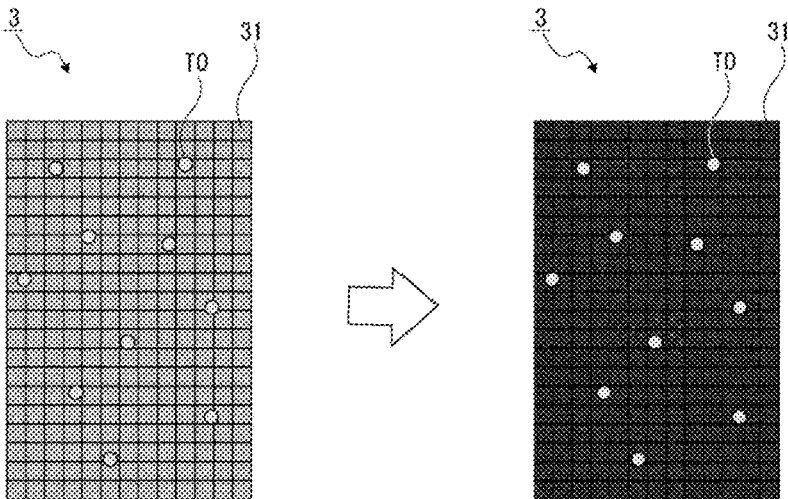
FIG. 24 is a diagram for explaining calibration processing according to modification 1.
Figure 25:
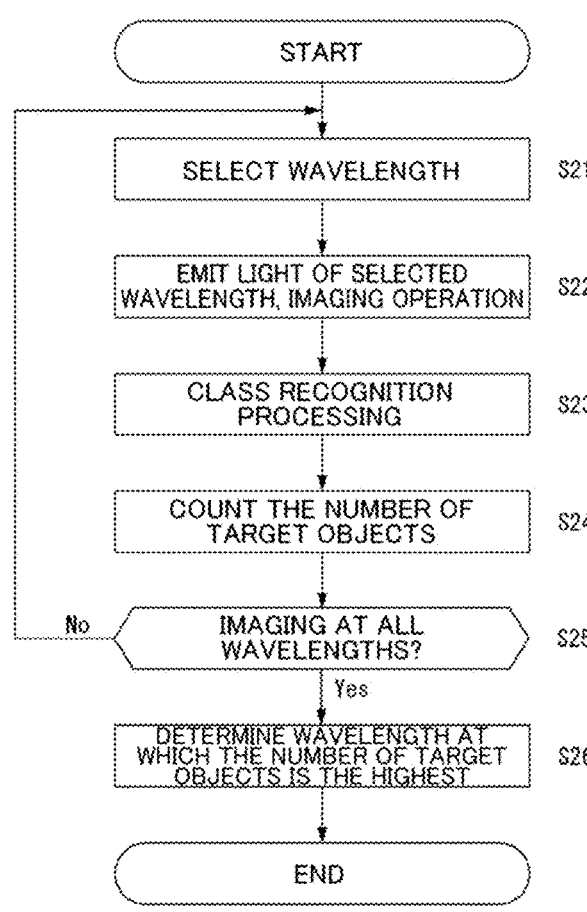
FIG. 25 is a flowchart showing a procedure of the calibration processing.

FIG. 24 is a diagram for explaining calibration processing according to modification 1. FIG. 25 is a flowchart showing a procedure of the calibration processing.

A measurement device according to modification 1 may have the configuration of any of the measurement devices 1, 100, 200, 300, 400, 500, and 600 according to the first embodiment to the third embodiment and other configuration examples described above, but the measurement device 1 according to the first embodiment will now be described as an example.

As shown on the left-hand side of FIG. 24, when the colors of target objects TO and the color of light (background light) emitted from the illumination unit 3 (light-emitting elements 31) are similar to each other, there is a risk that the target objects TO may not be identified from the image captured by the vision sensor 14a, even though the target objects TO are actually present in the imaging range.

Therefore, the measurement device 1 performs calibration processing for adjusting the color of the light (background light) emitted from the illumination unit 3, that is, the wavelength of the light, in order to image and measure the target objects TO efficiently. The calibration processing is performed at specific timing such as before the measurement processing is started or at predetermined intervals in a case where the number of target objects TO to be detected is equal to or less than a predetermined number.

As shown in FIG. 25, once the calibration processing is started, in step S21 the imaging control unit 21 sets the wavelength of light to be emitted from the illumination unit 3. Here, out of a plurality of light wavelengths determined in advance (e.g., 10-nm interval between 400 nm and 700 nm), the imaging control unit 21 sets any of the wavelengths that have not yet been set.

Then, in step S22, the imaging control unit 21 causes the illumination unit 3 to emit light having the wavelength set in step S21, and causes the vision sensor 14a to capture an image.

In step S23, the class identification unit 22 executes the same class identification processing as step S7 described above. Also, in step S24, the class identification unit 22 counts the number of target objects TO identified in step S23.

In step S25, the imaging control unit 21 determines whether imaging at the plurality of wavelengths determined in advance has ended or not. When the imaging at the plurality of wavelengths determined in advance has not yet ended (No in step S25), the imaging control unit 21 returns the processing to step S21.

When the imaging at the plurality of wavelengths determined in advance has ended (Yes in step S25), in step S26 the imaging control unit 21 determines a wavelength at which the number of target objects TO counted in step S24 is the highest, as a wavelength to be used in the measurement processing.

In this manner, in the measurement device 1, as shown on the right-hand side of FIG. 24, the colors of the target objects TO and the background color are no longer similar to each other, and the light of the wavelength at which the target objects TO are detected most easily can be emitted from the illumination unit 3. Thus, in the measurement device 1, the target objects TO can be imaged and measured efficiently.

Note that the imaging control unit 21 may determine a wavelength providing the lowest power consumption among the wavelengths at which the number of target objects TO counted in step S24 is equal to or greater than a specific number, as the wavelength to be used in the measurement processing. The imaging control unit 21 may also determine a wavelength with the least amount of noise (the ratio of objects other than the target objects to all objects to be detected) among the wavelengths at which the number of target objects TO counted in step S24 is equal to or greater than the specific number, as the wavelength to be used in the measurement processing.

5.2 Modification 2

Figure 26:
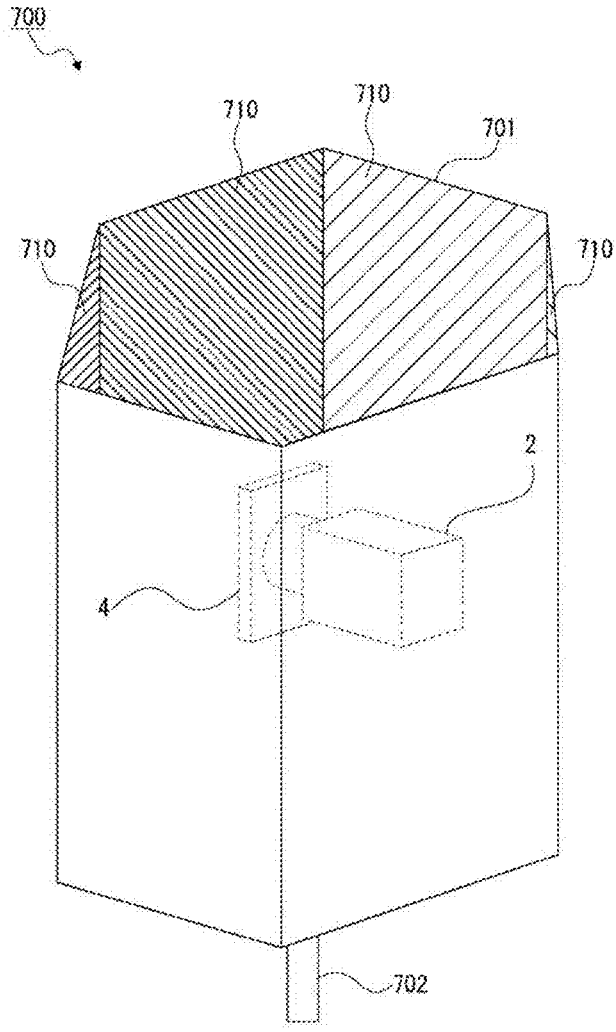
FIG. 26 is a diagram for explaining a configuration of a measurement device according to modification 2.

FIG. 26 is a diagram for explaining a configuration of a measurement device 700 according to modification 2. In modification 1, the color of the background is changed by changing the wavelength of the light emitted from the illumination unit 3, but in modification 2, the color of the background is changed by switching background plates of different colors.

As shown in FIG. 26, the measurement device 700 includes a background device 701 in place of the illumination unit 3, and a movement mechanism 702. Note that the illumination unit for emitting light in the imaging range of the imaging unit 14 may be provided separately.

The background device 701 has a plurality of background plates 710 of different colors connected to each other into a polygon, and a space is formed therein. The main body 2, the cell 4 and the like are provided inside of the background device 701. In addition, the background device 701 is arranged in such a manner that one of the background plate 710 appears as the background of the imaging range of the imaging unit 14.

The movement mechanism 702 includes an actuator such as a motor, and rotates the background device 701 on the basis of the control by the control unit 10.

In the calibration processing, in place of step S21 and step S22 described above, the control unit 10 drives and controls the movement mechanism 702 in such a manner that the background plates 710 of different colors appear as the background of the imaging range of the imaging unit 14.

In this manner, the measurement device 700 can image and measure the target objects TO efficiently as with modification 1 in which the illumination unit 3 emits light of different wavelengths.

Note that, for example, electronic ink may be used as a method for changing the background color.

5. Summary of Embodiments

The measurement device 1 according to the embodiments described above include: the vision sensor 14a that is arranged facing an illumination surface of the illumination unit 3 emitting light, and acquires pixel data asynchronously in accordance with the amount of light incident on each of a plurality of pixels arranged two-dimensionally; the imaging control unit 21 that causes the vision sensor 14a to capture an image; and the measurement unit (class identification unit 22, distance/speed measurement unit 23) that measures information related to a target object on the basis of an image captured by the vision sensor 14a. Thus, the measurement device 1 can set the distance between the illumination unit 3 and the vision sensor 14a short.

Thus, the measurement device 1 can reduce power consumption.

By using the vision sensor 14a, the measurement device 1 can also achieve a reduction in overexposure, high-speed imaging, a reduction in power consumption, and low computational cost.

In the measurement device 1 according to the present technology described above, the illumination unit 3 includes the plurality of light-emitting elements 31, and the imaging control unit 21 is considered to cause some of the light-emitting elements 31 of the illumination unit 3 to emit light.

As a result, only the particles that flow into a predetermined range facing the specific light-emitting elements 31 can be measured, and whether or not to cause all of the light-emitting elements 31 to emit light can be determined depending on the result of the measurement.

Thus, the measurement device 1 can perform a measurement efficiently while reducing power consumption.

In the measurement device 1 according to the present technology described above, the vision sensor 14a includes a plurality of photoelectric conversion elements corresponding to the light-emitting element 31, and the imaging control unit 21 is considered to drive the photoelectric conversion elements corresponding to some of the light-emitting elements 31 emitting light. Thus, the image (pixel data) can be acquired by driving the vision sensor 14a in conjunction with the illumination unit 3, further reducing the power consumption.

In the measurement device 1 according to the present technology described above, the imaging control unit 21 is considered to calculate the number of particles that are imaged by the vision sensor 14*a* when light is emitted from some of the light-emitting elements 31, and cause all of the light-emitting elements 31 of the illumination unit 3 to emit light when the calculated number of particles is equal to or greater than a predetermined threshold (particle number threshold).

Therefore, when the number of particles flowing into the imaging range of the vision sensor 14*a* is high, the measurement device 1 can perform an efficient measurement.

In the measurement device 1 according to the present technology described above, the imaging control unit 21 is considered to drive all of the photoelectric conversion elements of the vision sensor 14*a* when all of the light-emitting elements 31 of the illumination unit 3 emit light.

Thus, the image (pixel data) can be acquired by driving the vision sensor 14*a* in conjunction with the illumination unit 3, allowing for an efficient measurement.

In the measurement device 1 according to the present technology described above, the cell 4 having the openings 4*a*, 4*b* through which particles flow in and out is considered to be provided between the illumination unit 3 and the vision sensor 14*a*, and the imaging control unit 21 is considered to emit light from some of the light-emitting elements 31 corresponding to the openings 4*a*, 4*b* of the cell 4.

Thus, the particles flowing in and out of the cell 4 can be measured, and whether to continue the measurement or not can be determined.

Therefore, the measurement device 1 can perform an efficient measurement.

In the measurement device 1 according to the present technology described above, the imaging control unit 21 is considered to emit light of a predetermined wavelength from some of the light-emitting elements 31 of the illumination unit 3, and emit light of a different wavelength from the other light-emitting elements 31.

Thus, microorganisms having runnability can be measured efficiently.

In the measurement device 1 according to the present technology described above, between the illumination unit 3 and the vision sensor 14*a* are provided the cell having the openings 4*a*, 4*b* through which particles flow in and out, and the movement mechanism 201 for moving the cell 4 to the first position (cell-present position) between the illumination unit 3 and the vision sensor 14*a* and the second position (no-cell position) which is away from between the illumination unit 3 and the vision sensor 14*a*, and the imaging control unit 21 is considered to move the cell 4 to the first position or the second position by driving the movement mechanism 201.

Thus, switching between the measurement affected by water currents and the measurement not affected by water currents can be performed.

The measurement device 1 according to the present technology described above is considered to include the light-shielding unit 7 that houses the illumination unit 3, the vision sensor 14*a*, and the cell 4 and blocks light from coming in from the outside.

Therefore, the impact of the light coming from the outside can be reduced, allowing for a precise measurement.

The measurement device 1 according to the present technology described above is considered to include the conduction unit 5 having one end side connected to the openings 4*a*, 4*b* of the cell 4 so as to have a predetermined angle, and the light-shielding unit 7 is considered to house one end side of the conduction unit 5. Since one end side of the conduction unit 5 is connected so as to have a predetermined angle with respect to the cell 4, the entry of external light into the cell 4 through the conduction unit 5 can be reduced, allowing for a precise measurement.

In the measurement device 1 according to the present technology described above, the imaging control unit 21 is considered to calculate the number of target objects at each of a plurality of different wavelengths on the basis of each of the images captured by the vision sensor 14*a* when light of the plurality of different wavelengths is emitted from the illumination unit 3, and determine a wavelength at which the most target objects are detected, as the wavelength of the light that is emitted from the illumination unit 3 in the measurement by the measurement unit (measurement processing).

Thus, the colors of the target objects and the background color are no longer similar to each other, so the target objects can be measured efficiently.

The measurement device 1 according to the present technology described above, the imaging control unit 21 is considered to calculate the number of target objects at each of a plurality of different wavelengths on the basis of each of the images captured by the vision sensor 14*a* when light of the plurality of different wavelengths is emitted from the illumination unit 3, and determine a wavelength at which a specific number or more of target objects is detected, which is a wavelength with the least amount of power consumption, as the wavelength of the light that is emitted from the illumination unit 3 in the measurement by the measurement unit.

Thus, the target objects can be measured efficiently while reducing power consumption.

The imaging control unit 21 is considered to calculate the number of target objects at each of a plurality of different wavelengths on the basis of each of the images captured by the vision sensor 14*a* when light of the plurality of different wavelengths is emitted from the illumination unit 3, and determine a wavelength at which a specific number or more of target objects is detected, which is a wavelength with the least amount of noise, as the wavelength of the light that is emitted from the illumination unit in the measurement by the measurement unit.

Thus, the target objects can be measured efficiently while reducing noise.

The measurement method according to the present technology described above causes the vision sensor to acquire pixel data asynchronously in accordance with the amount of light incident on each of a plurality of pixels arranged two-dimensionally, the vision sensor being arranged facing an illumination surface of the illumination unit emitting light, and measures information related to a target object on the basis of the image captured by the vision sensor.

The program according to the present technology described above causes the vision sensor to acquire pixel data asynchronously in accordance with the amount of light incident on each of a plurality of pixels arranged two-dimensionally, the vision sensor being arranged facing an illumination surface of the illumination unit emitting light, and causes the measurement device to perform the processing of measuring information related to a target object on the basis of the image captured by the vision sensor.

The program can be recorded in advance in an HDD serving as a recording medium embedded in a device such as a computer device or a ROM or the like in a microcomputer that includes a CPU.

Alternatively, the program can be stored (recorded) temporarily or perpetually on a removable recording medium such as a flexible disc, a CD-ROM (Compact Disc Read Only Memory), a MO (Magneto Optical) disc, a DVD (Digital Versatile Disc), a Blu-ray Disc (registered trademark), a magnetic disk, a semiconductor memory, or a memory card. The removable recording medium can be provided as so-called package software.

The program can be installed from the removable recording medium to a personal computer or the like and can also be downloaded from a download site via a network such as a LAN (Local Area Network) or the Internet.

Note that the advantageous effects described in the present specification are merely exemplary and are not limited, and other advantageous effects may be obtained.

<6. Present Technology

The present technology can also adopt the following configurations.

(1)

A measurement device, including:

a vision sensor that is arranged facing an illumination surface of an illumination unit emitting light, and acquires pixel data asynchronously in accordance with the amount of light incident on each of a plurality of pixels arranged two-dimensionally;

an imaging control unit that causes the vision sensor to capture an image; and a measurement unit that measures information related to a target object on the basis of the image captured by the vision sensor.

(2)

The measurement device according to (1), wherein the illumination unit includes a plurality of light-emitting elements, and the imaging control unit is configured to emit light from some of the light-emitting elements of the illumination unit.

(3)

The measurement device according to (2), wherein the vision sensor includes a plurality of photoelectric conversion elements corresponding to the light-emitting elements, and the imaging control unit is configured to drive the photoelectric conversion elements corresponding to some of the light-emitting elements caused to emit light.

(4)

The measurement device according to (2) or (3), wherein the imaging control unit is configured to calculate the number of particles that are imaged by the vision sensor when some of the light-emitting elements are caused to emit light, and cause all of the light-emitting elements of the illumination unit to emit light in a case where the number of particles calculated is equal to or greater than a predetermined threshold.

(5)

The measurement device according to (4), wherein the imaging control unit is configured to drive all of the photoelectric conversion elements of the vision sensor when all of the light-emitting elements of the illumination unit are caused to emit light.

(6)

The measurement device according to any one of (2) to (5), further including:

a cell that is provided between the illumination unit and the vision sensor and has an opening through which particles can flow in and out, wherein the imaging control unit is configured to emit light from some of the light-emitting elements corresponding to the opening of the cell.

(7)

The measurement device according to (3) to (6), wherein the imaging control unit is configured to cause some of the light-emitting elements of the illumination unit to emit light of a predetermined wavelength and cause the other light-emitting elements to emit light of a different wavelength.

(8)

The measurement device according to any one of (1) to (7), further including:

a cell that is provided between the illumination unit and the vision sensor and has an opening through which particles can flow in and out; and a movement mechanism that moves the cell to a first position located between the illumination unit and the vision sensor, and a second position away from between the illumination unit and the vision sensor, wherein the imaging control unit is configured to move the cell to the first position or the second position by driving the movement mechanism.

(9)

The measurement device according to (6), further including a light-shielding unit that houses the illumination unit, the vision sensor, and the cell, and blocks light from entering inside from the outside.

(10)

The measurement device according to (9), further including a conduction unit that has one end side connected to the opening of the cell so as to have a predetermined angle, wherein the light-shielding unit houses the one end side of the conduction unit.

(11)

The measurement device according to any one of (1) to (10), wherein the imaging control unit is configured to calculate the number of target objects at each of a plurality of different wavelengths on the basis of each of images captured by the vision sensor when light of the plurality of different wavelengths is emitted from the illumination unit, and determine a wavelength at which the most target objects are detected, as a wavelength of light that is emitted from the illumination unit in a measurement by the measurement unit.

(12)

The measurement device according to any one of (1) to (10), wherein the imaging control unit is configured to calculate the number of target objects at each of a plurality of different wavelengths on the basis of each of images captured by the vision sensor when light of the plurality of different wavelengths is emitted from the illumination unit, and determine a wavelength at which a specific number or more of target objects is detected, which is a wavelength with the least amount of power consumption, as a wavelength of light that is emitted from the illumination unit in a measurement by the measurement unit.

(13)

The measurement device according to any one of (1) to (10), wherein the imaging control unit is configured to calculate the number of target objects at each of a plurality of different wavelengths on the basis of each of images captured by the vision sensor when light of the plurality of different wavelengths is emitted from the illumination unit, and determine a wavelength at which a specific number or more of target objects is detected, which is a wavelength with the least amount of noise, as a wavelength of light that is emitted from the illumination unit in measurement by the measurement unit.

(14)
A measurement method including:
causing a vision sensor to acquire pixel data asynchronously in accordance with the amount of light incident on each of a plurality of pixels arranged two-dimensionally, the vision sensor being arranged facing an illumination surface of an illumination unit emitting light; and
measuring information related to a target object on the basis of the image captured by the vision sensor.

(15)
A program that causes a measurement device to execute processing of:
causing a vision sensor to acquire pixel data asynchronously in accordance with the amount of light incident on each of a plurality of pixels arranged two-dimensionally, the vision sensor being arranged facing an illumination surface of an illumination unit emitting light; and
measuring information related to a target object on the basis of the image captured by the vision sensor.

REFERENCE SIGNS LIST

1 Measurement device
3 Illumination unit
10 Control unit
14 Imaging unit
14a Vision sensor
14b Imaging sensor
21 Imaging control unit
22 Class identification unit
23 Distance/speed measurement unit

The invention claimed is:
1. A measurement device, comprising:
an illumination source including a plurality of light-emitting elements;
a vision sensor that is arranged facing an illumination surface of the illumination source emitting light, and acquires pixel data asynchronously in accordance with an amount of light incident on each of a plurality of pixels arranged two-dimensionally; and
circuitry configured to
control the vision sensor to capture an image,
measure information related to a target object based on the image captured by the vision sensor,
control the illumination source to emit light from a subset of the plurality of light-emitting elements of the illumination source,
calculate the number of particles that are imaged by the vision sensor when the subset of the plurality of light-emitting elements is caused to emit light, and
control the illumination source to emit light from all of the plurality of light-emitting elements of the illumination source in a case where the number of particles that was calculated is equal to or greater than a predetermined threshold.

2. The measurement device according to claim 1, wherein the vision sensor includes a plurality of photoelectric conversion elements corresponding to the plurality of light-emitting elements, and
the circuitry is further configured to
drive a subset of the plurality of photoelectric conversion elements corresponding to the subset of the plurality of light-emitting elements caused to emit light.

3. The measurement device according to claim 1, wherein the vision sensor includes a plurality of photoelectric conversion elements corresponding to the plurality of light-emitting elements, and
the circuitry is further configured to
drive all of the plurality of photoelectric conversion elements of the vision sensor when all of the plurality of light-emitting elements of the illumination source are caused to emit light.

4. The measurement device according to claim 1, further comprising:
a cell that is provided between the illumination source and the vision sensor and has an opening through which particles can flow in and out, wherein
the circuitry is further configured to
control the illumination source to emit light from the subset of the plurality of light-emitting elements corresponding to the opening of the cell.

5. The measurement device according to claim 2, wherein the circuitry is further configured to
control the illumination source to cause the subset of the plurality of light-emitting elements of the illumination source to emit light of a predetermined wavelength and cause another subset of the plurality of light-emitting elements to emit light of a different wavelength.

6. The measurement device according to claim 1, further comprising:
a cell that is provided between the illumination source and the vision sensor and has an opening through which particles can flow in and out; and
a movement mechanism configured to move the cell to a first position located between the illumination source and the vision sensor, and a second position away from between the illumination source and the vision sensor, wherein
the circuitry is further configured to
move the cell to the first position or the second position by driving the movement mechanism.

7. The measurement device according to claim 4, further comprising:
a light-shielding housing that houses the illumination source, the vision sensor, and the cell, and blocks light from entering inside from the outside.

8. The measurement device according to claim 7, further comprising:
a conduction unit that has one end side connected to the opening of the cell so as to have a predetermined angle, wherein
the light-shielding housing houses the one end side of the conduction unit.

9. The measurement device according to claim 1, wherein the circuitry is further configured to
calculate the number of target objects detected at each of a plurality of different wavelengths based on each of images captured by the vision sensor when light of the plurality of different wavelengths is emitted from the illumination source, and determine a wavelength at which the most target objects are detected, as a wavelength of light that is to be emitted from the illumination source in a measurement by the circuitry.

10. The measurement device according to claim 1, wherein the circuitry is further configured to calculate the number of target objects detected at each of a plurality of different wavelengths based on each of images captured by the vision sensor when light of the plurality of different wavelengths is emitted from the illumination source, and determine a wavelength at which a specific number or more of target objects are detected with the least amount of power consumption, as a wavelength of light that is to be emitted from the illumination source in a measurement by the circuitry.

11. The measurement device according to claim 1, wherein the circuitry is further configured to calculate the number of target objects detected at each of a plurality of different wavelengths based on each of images captured by the vision sensor when light of the plurality of different wavelengths is emitted from the illumination source, and determine a wavelength at which a specific number or more of target objects are detected with the least amount of noise, as a wavelength of light that is to be emitted from the illumination source in measurement by the circuitry.

12. A measurement method comprising:

causing a vision sensor to capture an image by acquiring pixel data asynchronously in accordance with an amount of light incident on each of a plurality of pixels arranged two-dimensionally, the vision sensor being arranged facing an illumination surface of an illumination source that includes a plurality of light-emitting elements emitting light;

measuring information related to a target object based on the image captured by the vision sensor; and controlling the illumination source to emit light from a subset of the plurality of light-emitting elements corresponding to an opening of a cell that is provided between the illumination source and the vision sensor and has the opening through which particles can flow in and out.

13. A non-transitory computer-readable storage medium storing a program that causes a measurement device to execute processing of:

causing a vision sensor to capture an image by acquiring pixel data asynchronously in accordance with an amount of light incident on each of a plurality of pixels arranged two-dimensionally, the vision sensor being arranged facing an illumination surface of an illumination source emitting light;

measuring information related to a target object based on the image captured by the vision sensor, and driving a movement mechanism to move a cell that is provided between the illumination source and the vision sensor and has an opening through which particles can flow in and out, to a first position located between the illumination source and the vision sensor or to a second position away from between the illumination source and the vision sensor.

* * * * *